United States Patent
Kim et al.

(10) Patent No.: US 10,575,312 B2
(45) Date of Patent: Feb. 25, 2020

(54) METHOD OF ASSIGNING CHANNEL FOR UAS CONTROL AND NON-PAYLOAD COMMUNICATION (CNPC) SYSTEM

(71) Applicant: Electronics and Telecommunications Research Institute, Daejeon (KR)

(72) Inventors: Hee Wook Kim, Daejeon (KR); Kwang Jae Lim, Daejeon (KR); Tae Chul Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/827,527

(22) Filed: Nov. 30, 2017

(65) Prior Publication Data

US 2018/0160433 A1  Jun. 7, 2018

(30) Foreign Application Priority Data

Dec. 1, 2016 (KR) .................. 10-2016-0162971
Jun. 7, 2017 (KR) .................. 10-2017-0070712

(51) Int. Cl.
*H04W 72/08* (2009.01)
*H04B 7/185* (2006.01)
*H04W 72/04* (2009.01)

(52) U.S. Cl.
CPC ...... *H04W 72/082* (2013.01); *H04B 7/18504* (2013.01); *H04W 72/0406* (2013.01); *H04W 72/0446* (2013.01)

(58) Field of Classification Search
None
See application file for complete search history.

(56) References Cited

U.S. PATENT DOCUMENTS

| 5,230,082 | A | 7/1993 | Ghisler et al. |
| 5,915,221 | A | 6/1999 | Sawyer et al. |
| 9,497,683 | B2 | 11/2016 | Park et al. |
| 10,039,114 | B2 * | 7/2018 | Tan .................. H04W 16/14 |

(Continued)

FOREIGN PATENT DOCUMENTS

| EP | 2978258 A1 | 1/2016 |
| KR | 101036100 B1 | 5/2011 |

(Continued)

OTHER PUBLICATIONS

Kerczewski, "Spectrum for UAS control and Non-Payload Communications," 2013 Integrated Communications, Navigation and Surveillance Conference (ICNS), Herndon, VA, 2013, pp. 1-21. (Year: 2013).*

(Continued)

*Primary Examiner* — Ayaz R Sheikh
*Assistant Examiner* — Tarell A Hampton
(74) *Attorney, Agent, or Firm* — William Park & Associates Ltd.

(57) ABSTRACT

Disclosed is a channel assignment method of a communication system for controlling an unmanned aerial vehicle (UAV), the method including receiving assignment data and an interference analysis criterion from a spectrum authority; performing an interference analysis and selecting a control and non-payload communication (CNPC) channel based on the assignment data and the interference analysis criterion; and requesting the spectrum authority for assigning the CNPC channel.

16 Claims, 24 Drawing Sheets

(56) References Cited

U.S. PATENT DOCUMENTS

| | | | |
|---|---|---|---|
| 2002/0160785 A1 | 10/2002 | Ovesjo et al. | |
| 2002/0177439 A1 | 11/2002 | Karlsson et al. | |
| 2003/0137953 A1 | 7/2003 | Chae et al. | |
| 2004/0125784 A1 | 7/2004 | Lee et al. | |
| 2004/0185870 A1 | 9/2004 | Matsuda | |
| 2005/0153743 A1 | 7/2005 | Berra et al. | |
| 2005/0221824 A1 | 10/2005 | Lee et al. | |
| 2006/0092960 A1* | 5/2006 | Lee | H04L 1/1845 370/412 |
| 2006/0217090 A1* | 9/2006 | Pan | H03F 1/0261 455/127.4 |
| 2007/0010252 A1 | 1/2007 | Balachandran et al. | |
| 2007/0161347 A1 | 7/2007 | Ma et al. | |
| 2008/0221951 A1* | 9/2008 | Stanforth | G06Q 10/063 705/7.41 |
| 2009/0047961 A1 | 2/2009 | Kim | |
| 2009/0161610 A1* | 6/2009 | Kang | H04B 1/715 370/329 |
| 2009/0163221 A1* | 6/2009 | Abedi | H04W 16/10 455/452.1 |
| 2009/0164638 A1 | 6/2009 | Jang et al. | |
| 2009/0286534 A1 | 11/2009 | Garg et al. | |
| 2009/0296635 A1 | 12/2009 | Hui et al. | |
| 2009/0298522 A1* | 12/2009 | Chaudhri | H04W 16/14 455/509 |
| 2010/0279702 A1 | 11/2010 | Kazmi et al. | |
| 2011/0014921 A1 | 1/2011 | Neil | |
| 2013/0311669 A1* | 11/2013 | Reimers | H04H 20/42 709/231 |
| 2014/0187247 A1 | 7/2014 | Sarkar et al. | |
| 2014/0362717 A1 | 12/2014 | Koskinen et al. | |
| 2015/0142579 A1* | 5/2015 | Xiong | H04M 3/4878 705/14.64 |
| 2015/0181601 A1* | 6/2015 | Schmidt | H04W 12/08 370/329 |
| 2016/0088636 A1* | 3/2016 | Zhao | H04W 72/082 455/454 |
| 2016/0094999 A1* | 3/2016 | Yu | H04W 16/14 455/454 |
| 2016/0192358 A1 | 6/2016 | Lee et al. | |
| 2016/0227416 A1* | 8/2016 | Suzuki | H04W 72/0453 |
| 2017/0041802 A1* | 2/2017 | Sun | H04W 16/14 |
| 2017/0208476 A1* | 7/2017 | Khambekar | H04W 16/14 |
| 2017/0331658 A1 | 11/2017 | Chen et al. | |
| 2018/0139074 A1 | 5/2018 | Hong et al. | |
| 2018/0160433 A1 | 6/2018 | Kim et al. | |
| 2018/0241514 A1* | 8/2018 | Kim | H04L 5/0044 |

FOREIGN PATENT DOCUMENTS

| | | |
|---|---|---|
| KR | 101079655 B1 | 11/2011 |
| KR | 1020150117879 A | 10/2015 |
| WO | 2016140410 A1 | 9/2016 |

OTHER PUBLICATIONS

R.J. Kerczewski, J.H. Griner, Control and non-payload communications links for integrated unmanned aircraft operations, NASA, 2012 (Year: 2012).*

Bretmersky, Steven C., et al. "Communications technology assessment for the unmanned aircraft system (UAS) control and non-payload communications (CNPC) link." (2014).*

Griner, UAS integration in the National Airspace System (NAS) project CNPC system development and testing, I-CNS Plenary, USA.

* cited by examiner

METHOD OF ASSIGNING CHANNEL FOR UAS CONTROL AND NON-PAYLOAD COMMUNICATION (CNPC) SYSTEM

CROSS-REFERENCE TO RELATED APPLICATION(S)

This application claims the priority benefit of Korean Patent Application No. 10-2016-0162971 filed on Dec. 1, 2016, and Korean Patent Application No. 10-2017-0070712 filed on Jun. 7, 2017 in the Korean Intellectual Property Office, the disclosures of which are incorporated herein by reference for all purposes.

BACKGROUND

1. Field

At least one example embodiment relates to a method and procedure of dynamically assigning, returning, and reassigning a control and non-payload communication (CNPC) channel and a video channel in a point-to-point (P2P) and point-to-multipoint (P2MP) unmanned aerial vehicle (UAV) CNPC system to efficiently use and manage a limited UAV control spectrum.

2. Description of Related Art

All the elements used for an entire flight process, including an unmanned aerial vehicle (UAV) and communication systems for controlling takeoff/cruise, a flight, landing/return, etc., of the UAV are inclusively referred to as an UAV system (UAS) or a remotely piloted aircraft system (RPAS).

The UAS includes an UAV ground control station (GCS), an UAV, and a data link. Here, the data link is a radio data link between a ground radio station (GRS) and the UAV. The data link of the UAS may be classified into a UAS ground control and non-payload communication (CNPC) data link and a UAS payload data link.

A payload data link is a link used to transfer payload related data and is generally broader than a CNPC data link. On the contrary, a CNPC data link is a link used to transfer data associated with control of a UAV flight, monitoring of a UAS status, and management of the CNPC link, and includes a pilot/air traffic control center (ATCC) relay link and a UAS control link. The pilot/ATCC relay link is a communication link used to relay voice and data between an ATCC and a pilot through a UAV, and the UAS control link is a link used to transfer control information associated with safe flight between the pilot and the UAV. The UAS control link may be classified into a telecommand (TC) link and a telemetry (TM) link. The TC link is an uplink used to transfer flight orbit control information, any type of UAV system control information required for safe flight, etc., from a pilot on the ground to the UAV. The TM link is a downlink used to transfer a location, altitude, and speed of the UAV, an operation mode and status of a UAS, navigation aid data, tracking associated with detection and avoidance, a weather radar, image information, etc., from the UAV to the pilot on the ground.

In general, a C band (5030 megahertz (MHz) to 5091 MHz) is considered as a frequency for an UAV ground CNPC data link. Here, the C band is distributed as a new exclusive band in the World Radiocommunication Conference, 2012 (WRC-12). In addition, a band, for example, an L band (960-1164 MHz), distributed for an aeronautical mobile service may be considered. Here, the L band has a standard, such as a guideline, to be available for the aeronautical mobile service in the WRC-12. In the case of the C band, a frequency jamming effect with an existing system and a multipath delay spread may be relatively small and a directional antenna may be used to secure a link margin. Further, the C band may have a Doppler effect greater by five times than that of the L band. On the other hand, in the case of a low frequency band distributed for other aeronautical mobile services, such as the L band, the low frequency band may have an excellent propagation characteristic compared to the C band. For example, the L band may have a propagation loss lower by about 14 decibels (dB) than the C band. Since existing airborne systems, for example, distance measurement equipment (DME), automatic dependent surveillance-broadcast (ADS-B), tactic air navigation system (TACAN), and the like, are operated in a congested status, there is a difficulty to secure a frequency and a great multipath delay spread occurs. Accordingly, the secured C band may be used as a base link of ground CNPC and the low frequency band, for example, the L band, a ultra high frequency (UHF), etc., may be used to enhance CPNC link availability for the safe navigation of the UAV. Alternatively, the C band and the low frequency band may be used in reverse or used independently.

A connection type of a ground CNPC data link may include a point-to-point (P2P) type and a network-based point-to-multipoint (P2MP) type. The P2P type is generally used for an existing UAS as a concept in which a single ground control station (GCS) and an UAV directly forms a data link. The network-based P2MP is a type in which ground radio stations (GRSs) are connected over a network and each CS exchanges information with the UAV through a ground network and a GRS. To expand the application of public and private UAVs, the P2MP type capable of simultaneously forming a communication link with a plurality of UAVs and also forming a national network may be considered as a next generation CNPC data link. Technology associated with such P2MP UAS CNPC system has not been actively proposed.

Also, to operate an existing P2P UAS CNPC system, a video channel for CNPC and takeoff/landing or emergency is to be assigned. In the related art, a spectrum authority (SA) statically assigns a channel during a long period of time, for example, generally, 1 year or more, when registering a UAS CNPC system. Thus, a channel assigned to a specific UAS CNPC system may not be readily used for another UAS CNPC system.

Accordingly, to stably operate UAVs and expand a demand for UAVs, there is a need for technology that may efficiently use UAV control and CNPC frequency resources capable of efficiently operating a plurality of UAVs in a limited UAV CNPC frequency band. However, an existing UAV CNPC channel is statically assigned with respect to existing point-to-point (P2P) CNPC systems during a relatively long period of time, for example, generally, 1 year or more. That is, a channel assigned to a specific UAV system (UAS) CNPC system may not be readily used for another UAS CNPC system. Considering that CNPC frequency resources are limited, a number of communication channels capable of accommodating the UAS CNPC system may be limited. Also, in an uplink time division multiple access (TDMA)/downlink frequency division multiple access (FDMA) point-to-multipoint (P2MP) system, a single ground radio station (GRS) forms a CNPC link with a plurality of UAVs in an uplink frequency. Accordingly, it may be difficult to apply an existing scheme of assigning a frequency channel to each P2P CNPC system.

SUMMARY

As technology for efficiently using UAV control communication frequency resources capable of efficiently operating a plurality of UAVs in a limited frequency band exclusive for controlling UAVs in order to stably operate unmanned aerial vehicles (UAVs) and expand a demand for UAVs, example embodiments may provide a method and procedure for assigning a dynamic CNPC channel and a video channel in a new UAS CNPC system that may be applicable even to a future P2MP CNPC system configured to enhance a limited CNPC frequency use and to simultaneously support the plurality of UAVs in such a manner that a spectrum authority manages all of the frequencies in real time instead of statically assigning a specific frequency to a specific CNPC system, dynamically assigns a frequency only for operation of a UAS CNPC system, and retrieves the assigned frequency immediately after the operation is completed, and reuses the retrieved frequency in another UAS CNPC system.

According to an aspect of example embodiments, there is provided a channel assignment method including receiving assignment data and an interference analysis criterion from a spectrum authority; performing an interference analysis and selecting a control and non-payload communication (CNPC) channel based on the assignment data and the interference analysis criterion; and requesting the spectrum authority for assigning the CNPC channel.

The channel assignment method may further include transmitting a confirmation message to the spectrum authority in response to receiving a request approval from the spectrum authority.

The channel assignment method may further include receiving second assignment data and a second interference analysis criterion from the spectrum authority in response to receiving a request approval disallowance from the spectrum authority; performing an interference analysis on the second assignment data and selecting a second CNPC channel based on the second interference analysis criterion; and requesting the spectrum authority for assigning the second CNPC channel.

The channel assignment method may further include instructing an unmanned aerial vehicle (UAV) to perform a contingency plan in response to receiving a request approval disallowance from the spectrum authority.

The CNPC channel may include an uplink and a downlink.

The selecting may include receiving an assignment of a center frequency and a bandwidth corresponding to the uplink from the spectrum authority; selecting a ground radio station to operate an UAV; and selecting a number of time slots and locations of the time slots to be used for a center frequency and a bandwidth of the ground radio station corresponding to the uplink based on the assignment data and the interference analysis criterion. The requesting may include requesting the spectrum authority for the number of time slots and the locations of the time slots.

The selecting may include selecting a center frequency and a bandwidth corresponding to the downlink based on the assignment data and the interference analysis criterion, and the requesting may include requesting the spectrum authority for the center frequency and the bandwidth corresponding to the downlink.

The channel assignment method may further include performing the interference analysis and selecting a video channel based on the assignment data and the interference analysis criterion; and requesting the spectrum authority for assigning the video channel.

The video channel may include at least one of a takeoff video channel, a landing video channel, and an emergency video channel.

The channel assignment method may further include receiving an assignment of a handover channel from the spectrum authority; and performing a handover from the CNPC channel to the handover channel.

The channel assignment method may further include disconnecting a CNPC radio link in response to landing of an UAV; and returning the CNPC channel to the spectrum authority.

According to another aspect, there is provided a channel assignment method including receiving a request for assigning operation control and non-payload communication (CNPC) transmission and reception information and a CNPC channel from a ground control station; performing an interference analysis and determining whether the CNPC channel is assignable based on the operation CNPC transmission and reception information and an interference analysis criterion; and transmitting information regarding the determination as to whether the CNPC channel is assignable to the ground control station.

The transmitting may includes notifying the ground control station of an assignment request approval of the CNPC channel in response to the CNPC channel being determined to be assignable; and providing information of the CNPC channel to the ground control station.

The transmitting may include notifying the ground control station of an assignment request approval disallowance of the CNPC channel in response to the CNPC channel being determined to be un-assignable; and providing a reason of the assignment request approval disallowance to the ground control station.

The CNPC channel may include an uplink and a downlink.

The determining may include assigning a center frequency and a bandwidth corresponding to the uplink to the ground control station; selecting a ground radio station to operate an unmanned aerial vehicle (UAV); and selecting a number of time slots and locations of the time slots to be used for a center frequency and a bandwidth of the ground radio station corresponding to the uplink and determining whether the CNPC channel is assignable based on the operation CNPC transmission and reception information and the interference analysis criterion.

The determining may include selecting a center frequency and a bandwidth corresponding to the downlink and determining whether the CNPC channel is assignable based on the operation CNPC transmission and reception information and the interference analysis criterion.

The channel assignment method may further include receiving video channel transmission and reception information, takeoff airport information, and a request for assigning a video channel from the ground control station; and performing the interference analysis and determining whether the video channel is assignable based on the video channel transmission and reception information and the takeoff airport information.

The video channel may include at least one of a takeoff video channel, a landing video channel, and an emergency video channel.

The channel assignment method may further include receiving a return of the CNPC channel from the ground control station in response to a disconnection of a CNPC radio link; and approving the return of the CNPC channel with respect to the ground control station.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
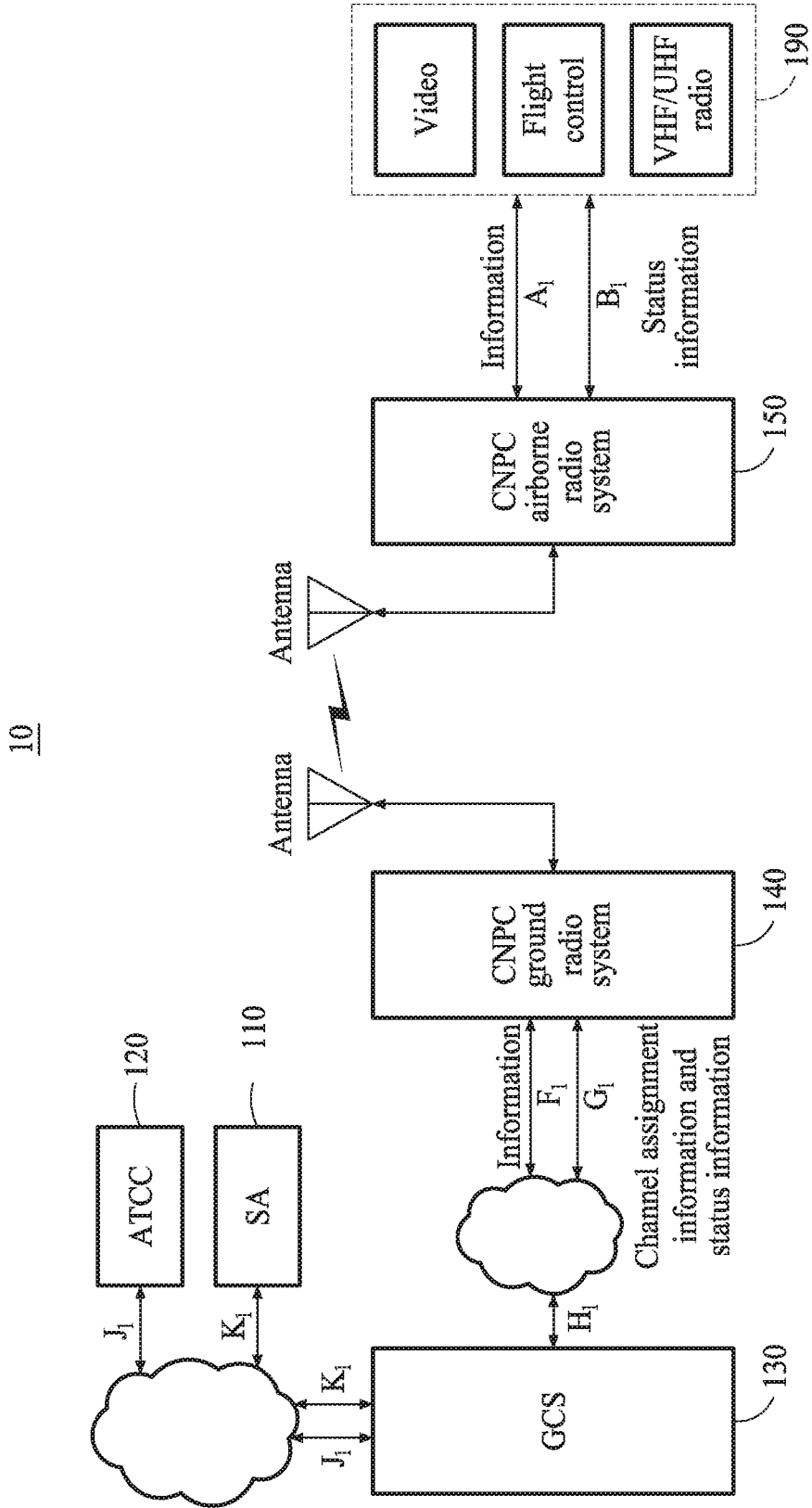
FIG. 1 illustrates an example of information exchange and a relationship with neighboring systems to achieve a stable operation of an unmanned aerial vehicle (UAV) in an UAV control and non-payload communication (CNPC) system according to example embodiments.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

FIG. 1 illustrates an example of information exchange and a relationship with neighboring systems to achieve a stable operation of an unmanned aerial vehicle (UAV) in an UAV control and non-payload communication (CNPC) system according to example embodiments.

Referring to FIG. 1, an UAV CNPC system 10 includes a spectrum authority (SA) 110, an air traffic control center (ATCC) 120, a ground control station (GCS) 130, a CNPC ground radio system 140, and a CNPC airborne radio system 150. The CNPC ground radio system 140 may indicate a ground radio station (GRS).

The UAV CNPC system 10 may be a UAV CNPC system that controls an UAV 190 based on a point-to-point (P2P) type. The UAV 190 may include at least one of a video, a flight control, and a very high frequency (VHF)/ultra high frequency (UHF) radio.

For an operation of a P2P UAV CNPC system, the GRS 130 may request the SA 110 for a channel and the SA 110 may assign a channel to the GCS 130 in operation $K_1$.

In operation $H_1$, the GCS 130 may transmit ground/UAV CNPC radio channel assignment information and status information $G_1$ and information $F_1$ to the CNPC ground radio system 140 through a distribution system. Here, the information $F_1$ may include UAV control data and communication data with the ATCC 120.

The CNPC ground radio system 140 may transfer information $A_1$ including the UAV control data and the communication data with the ATCC 120 to the flight control and the VHF/UHF radio. Here, the UAV control data may include UAV telemetry and video data. The information $A_1$ including the UAV control data and the communication data with the ATCC 120 may be substantially the same as the information $F_1$ including the UAV control data and the communication data with the ATCC 120. Also, the CNPC ground radio system 140 may transfer CNPC airborne radio status information $B_1$ to the flight control.

The CNPC airborne radio system 150 may transfer the information $A_1$ including the UAV control data and the communication data with the ATCC 120 to the CNPC ground radio system 140. In operation $H_1$, the CNPC ground radio system 140 may transfer the CNPC Radio channel assignment information and status information $G_1$ and the information $F_1$ transferred from the CNPC airborne radio system 150 to the GCS 130 over a wired/wireless network. Hereinafter, a characteristic of the UAV CNPC system 10 is described.

The UAV CNPC system 10 may operate in the following link configuration:

1) The UAV CNPC system 10 may include a plurality of pairs of ground stations and airborne radio stations. Each single ground station and each single airborne radio station may form a one-to-one communication link.

2) If the UAV CNPC system 10 is a standalone system, the UAV CNPC system 10 may expand coverage through GRS switching and control right transfer of the GCS 130.

3) The UAV CNPC system 10 may configure a frequency division multiple access (FDMA) based ground station so that a single ground station may support a plurality of P2P UAVs.

An uplink channel and a downlink channel of the UAV CNPC system 10 may operate in the following configuration:

1) The UAV CNPC system 10 may operate in an FDMA channel in an uplink from a ground station to an airborne radio station and a downlink from the airborne radio station to the ground station.

2) The UAV CNPC system 10 may support a simultaneous transmission and reception in a dual band channel, for example, an L band and a C band.

3) The UAV CNPC system 10 may support four data classes (DC1) each having a plurality of symbol rates, for example, 34.5 ksps, 69 ksps, 103.5 ksps, and 38 ksps.

4) The UAV CNPC system 10 may support a different number of supporting channel bandwidths for each link direction and band.

5) The UAV CNPC system 10 may support DC1, DC2, or DC3 in the uplink, and may support DC1, DC2, DC3, DC4, DC5, or DC6 in the downlink.

6) The airborne radio station of the UAV CNPC system 10 may support a simultaneous transmission of two FDMA channels. For example, the two FDMA channels may include a single channel for UAV control among DC1 to C4 and a single channel for safety video between DC5 and DC6.

7) The UAV CNPC system 10 may operate in a fixed channel in addition to a channel reassignment and handover.

Figure 2:
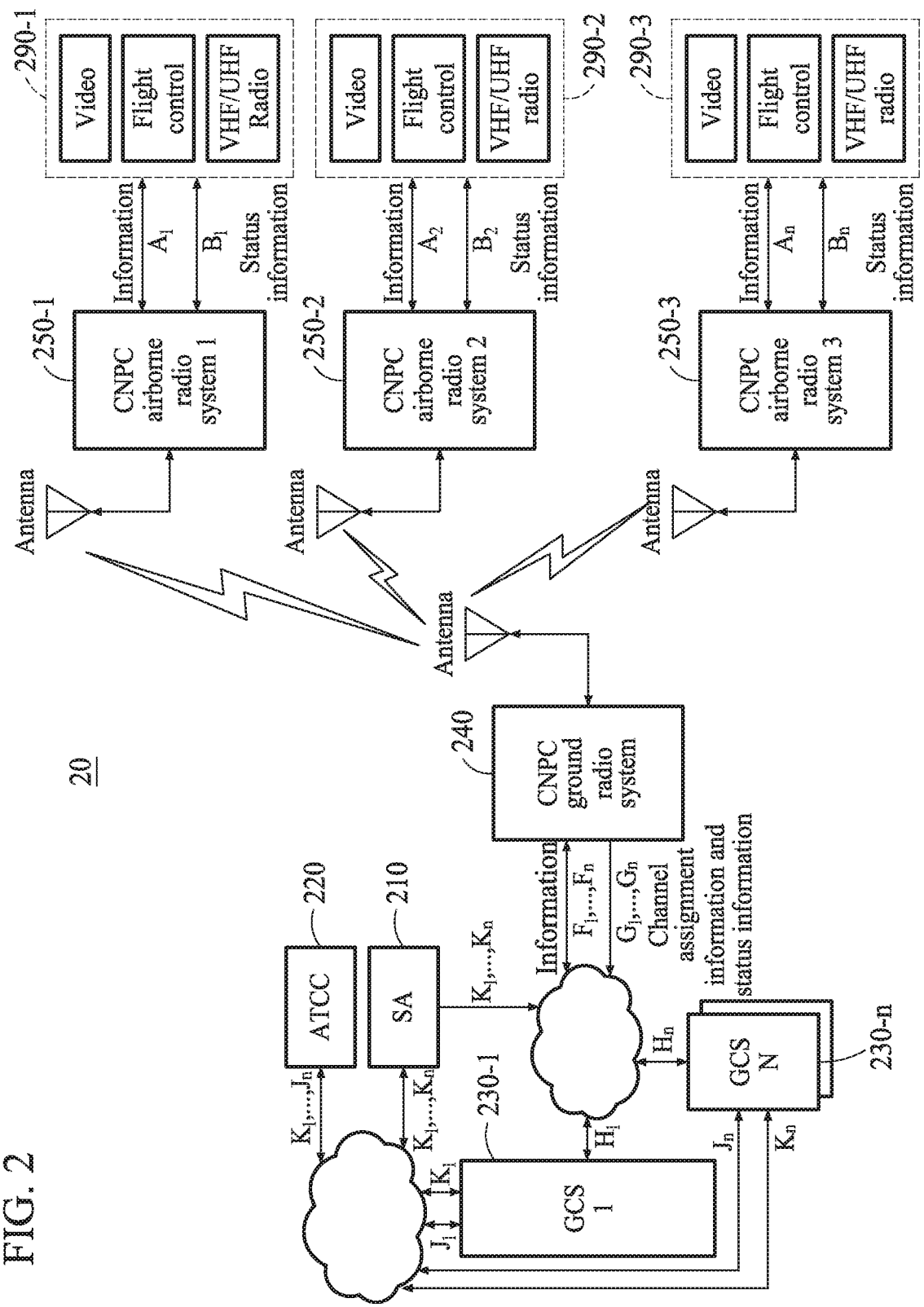
FIG. 2 illustrates another example of information exchange and a relationship with neighboring systems to achieve a stable operation of an UAV in an UAV CNPC system according to example embodiments.

FIG. 2 illustrates another example of information exchange and a relationship with neighboring systems to achieve a stable operation of an UAV in an UAV CNPC system according to example embodiments.

Referring to FIG. 2, an UAV CNPC system 20 includes a SA 210, an ATCC 220, GCSs 230-1 to 230-$n$, a CNPC ground radio system 240, and CNPC airborne radio systems 250-1 to 250-3. The CNPC ground radio system 240 may include a GRS. The UAV CNPC system 20 may be a UAV control system that controls UAVs 290-1 to 290-3 based on a point-to-multipoint (P2MP) type. Each of the UAVs 290-1 to 290-3 may include at least one of a video, a flight control, and a VHF/UHF radio.

Configurations and operations of the SA 210, the ATCC 220, the GCSs 230-1 to 230-$n$, the CNPC ground radio system 240, and the CNPC airborne radio systems 250-1 to 250-3 may be substantially to the same as those of the SA 110, the ATCC 120, the GCS 130, the CNPC ground radio system 140, and the CNPC airborne radio system 150 of FIG. 1.

For clarity of description, FIG. 2 illustrates three CNPC airborne radio systems 250-1, 250-2, and 250-3 and three UAVs 290-1, 290-2, and 290-3. However, it is provided as an example only. A plurality of CNPC airborne radio systems and a plurality of UAVs may be configured.

For an operation of a P2MP UAV CNPC system, the GCSs 230-1 to 230-$n$ may request the SA 210 for a channel and the SA 210 may assign a channel to the GCSs 230-1 through 230-$n$ through operation $K_1$ to $K_n$.

In operations $H_1$ to $H_n$, the GCSs 230-1 to 230-$n$ may transmit information $F_1$ including UAV control data and communication data with the ATCC 220 to the CNPC ground radio system 240 through a distribution system. The SA 210 may transmit UAV channel assignment information $K_1$ to $K_n$ to the CNPC ground radio system 240. The CNPC ground radio system 240 may transfer information $A_1$ to $A_n$ transferred from the GCSs 230-1 to 230-n to flight controls and VHFs/radios of the UAV 290-1 to 290-3 that are controlled by the GCSs 230-1 to 230-n. The information $A_1$ to $A_n$ may include the UAV control data and the communication data with the ATCC 120 Here, the UAV control data may include UAV telemetry and video data. The information $A_1$ to $A_n$ including the UAV control data and the communication data with the ATCC 120 may be substantially to the same as the information $F_1$ to $F_n$ including the UAV control data and the communication data with the ATCC 120. Also, the CNPC ground radio system 240 may transfer CNPC airborne radio status information $B_1$ to $B_n$ to the flight controls.

The CNPC airborne radio systems 250-1 to 250-3 may transfer the information $A_1$ to $A_n$ including the UAV control data and the communication data with the ATCC 120, which is relayed from the VHFs/UHF radios, to the CNPC ground radio system 240. In operations $H_1$ to $H_n$, the CNPC ground radio system 240 may transfer the CNPC radio channel assignment information and status information $G_1$ to $G_n$ and the information $F_1$ to $F_n$ transferred from the CNPC airborne radio systems 250-1 to 250-3 to the GCSs 230-1 to 230-n over a wired/wireless network.

A communication service for safe navigation control provided from the UAV CNPC system 20 between the GCSs 230-1 to 230-n and the UAVs 290-1 to 290-3 may vary depending on an uplink or a downlink. For example, in the uplink, the communication service for safe navigation control may include at least one of telecommand information, ATCC relay information, and navigation aid (NavAid) setting information. In the downlink, the communication service for safe navigation control may include at least one of telemetry information, ATCC relay information, NavAid information, DAA target information, weather radar information, safety takeoff/landing video information, and emergency video information. The ATCC relay information may include ATCC audio and data relay information.

The UAV CNPC system 20 may define and provide various types of service classes to provide a variety of services based on a channel capacity. The channel capacity may be a CNPC channel capacity associated with the UAVs 290-1 to 290-3.

For example, with respect to the uplink, the CNPC airborne radio systems 250-1 to 250-3 may define a service class as shown in the following Table 1, and may provide a variety of service classes based on an assigned channel bandwidth or channel capacity. With respect to the downlink, the CNPC airborne radio systems 250-1 to 250-3 may define a service class as shown in the following Table 2 and may provide a variety of service classes based on an assigned channel bandwidth or channel capacity.

TABLE 1

|  | Service Class 1 | Service Class 2 | Service Class 3 |
|---|---|---|---|
| Telecommand | O | O | O |
| ATC Relay |  | O | O |
| NavAid Setting |  |  | O |

TABLE 2

|  | Service Class 1 | Service Class 2 | Service Class 3 | Service Class 4 | Service Class 5 | Service Class 6 |
|---|---|---|---|---|---|---|
| Telemetry | O | O | O | O |  |  |
| ATC Relay |  | O | O | O |  |  |
| NavAid |  |  | O | O |  |  |
| DAA Target |  |  | O | O |  |  |
| Weather Radar |  |  |  | O |  |  |
| Take-off landing video |  |  |  |  | O |  |
| Emergency video |  |  |  |  |  | O |

Services provided from the CNPC airborne radio systems 250-1 to 250-3 may need to include telecommand information (an uplink from a ground station to an airborne radio station) and telemetry information (a downlink from the airborne radio station to the ground station) to control the UAVs 290-1 to 290-3. In addition, at least one of TC/TM data, ATCC relay information, NavAid information, DAA target information, weather radar information, and video information may be further included based on the capacity of a GRS and a UAV including radio station (URS) and the assigned channel capacity or bandwidth.

The CNPC airborne radio systems 250-1 to 250-3 may provide a video service (for example, safe takeoff/landing video information and/or emergency video information) that may be available for takeoff/landing and emergency through a single band (for example, a C band for controlling an UAV) of a separate downlink channel. That is, the CNPC airborne radio systems 250-1 to 250-3 may simultaneously transmit a single service class among service classes 1 to 4 and a single service class between the service classes 5 and 6 through different channels of the C band in response to an occurrence of takeoff/landing or en-route emergency.

The UAV CNPC system 20 may operate in a dual band to satisfy the link availability of 99.999%. For example, the CNPC airborne radio systems 250-1 to 250-3 may operate in a dual band of the L band and the C band assigned for controlling a UAV. The UAV CNPC system 20 may transmit the same information or different information in the dual band. When the CNPC airborne radio systems 250-1 to 250-3 transmit the same information, signal diversity gain between the L band and the C band may be acquired in a physical layer. When the CNPC airborne radio systems 250-1 to 250-3 transmit different information, the SA 210 may assign different bandwidths to the C band and the L band.

Here, the C band may be a frequency band used exclusively for a UAV and a whole frequency band of 61 MHz, and may be used for UAV CNPC. For example, the CNPC airborne radio systems 250-1 to 250-3 may transmit at least one of TC/TM data, ATCC relay information, DAA target information, and weather radar information in the C band.

In the L band, interference with another aeronautical radio device may occur. For example, the CNPC airborne radio systems 250-1 to 250-3 may transmit TC/TM data in the L band. Hereinafter, a characteristic of the UAV CNPC system 20 is described.

The UAV CNPC system 20 may operate in the following link configuration:

1) The UAV CNPC system 20 may include a plurality of ground stations that simultaneously supports a plurality of airborne radio stations.

2) If the UAV CNPC system 20 is connected over a network, the UAV CNPC system 20 may expand coverage through a handover between ground stations.

3) The UAV CNPC system 20 may configure a time division multiplexing (TDM) based ground station so that a single ground station may support a plurality of airborne radio stations.

An uplink channel and a downlink channel of the UAV CNPC system 20 may operate in the following configuration:

1) The UAV CNPC system 20 may operate in a TDM channel in an uplink from a ground station to an airborne radio station.

2) The UAV CNPC system 20 may assign a different TDM time slot for each airborne radio and may identify a corresponding airborne radio station based on the TDM time slot.

3) The UAV CNPC system 20 may statically assign a channel bandwidth, for example, a number of TDM time slots, and a frequency of the ground station. In response to performing long-term update, the UAV CNPC system 20 may change the number of TDM time slots.

4) The UAV CNPC system 20 may simultaneously support the plurality of airborne radio stations and efficiently support a change of a channel within a cell by flexibly changing a number of time slots assigned to an airborne radio station communicating with a corresponding ground station and locations of the time slots.

5) The UAV CNPC system 20 may operate in an FDMA channel in a downlink from the airborne radio station to the ground station.

6) The UAV CNPC system 20 may support a simultaneous transmission and reception in a dual band channel, for example, an L band and a C band.

7) The UAV CNPC system 20 may support a plurality of symbol rates, for example, eight channel bandwidths including 103.5 ksps, 207 ksps, 310.5 ksps, 414 ksps, 517.5 ksps, 621 ksps, 724.5 ksps, and 828 ksps.

8) The UAV CNPC system 20 may support a different number of TDM time slots based on an uplink channel bandwidth. For example, the UAV CNPC system 20 may support three TDM time slots for 103.5 ksps, six TDM time slots for 207 ksps, and 24 TDM time slots for 828 kHz.

9) The UAV CNPC system 20 may support a different number of channel symbol rates for each link direction and band. For example, the UAV CNPC system 20 may support 103.5 ksps, 207 ksps, 310.5 ksps, 414 ksps, 517.5 ksps, 621 ksps, 724.5 ksps, and 828 ksps in the uplink, and may support 34.5 ksps, 69 ksps, 103.5 ksps, and 138 ksps in the downlink.

10) The airborne radio station of the UAV CNPC system 20 may support a simultaneous transmission of two FDMA channels. For example, the two FDMA channels may include a single channel for UAV control among DC1 to C4 and a single channel for safety video between DC5 and DC6.

11) The UAV CNPC system 20 may operate in a fixed channel in addition to a channel reassignment and handover.

Hereinafter, a channel assignment method of the UAV CNPC system 10 or 20 is described.

The example embodiments relate to a method and procedure for assigning, returning, and reassigning a CNPC channel and a video channel in an UAV CNPC system, and more particularly, to a dynamic CNPC/video channel assignment and change procedure of a P2P/P2MP UAV CNPC system for dynamically assigning and retrieving a communication channel only in response to a system operation request through a communication channel management by an SA instead of statically assigning the communication channel to the UAV CNPC system in order to efficiently use and manage a limited UAV spectrum in the national airspace.

The example embodiments relate to a distributive and central channel assignment method in which an SA may efficiently assign and manage a limited UAV CNPC spectrum in the national airspace and to a procedure in which an SA may dynamically assign and change a CNPC channel and a video channel to a next generation uplink TDMA/downlink FDMA based P2MP UAV CNPC system including a plurality of UAV supporting GRSs as well as an existing P2P UAV CNPC system based on the assignment method.

Hereinafter, a method and process for dynamically assigning a CNPC channel and a video channel between an SA and a UAS CNPC system including a GCS, a P2P GRS, and a P2MP GRS, so that the SA may efficiently assign and manage a limited UAV control spectrum in the national airspace.

Figure 3:
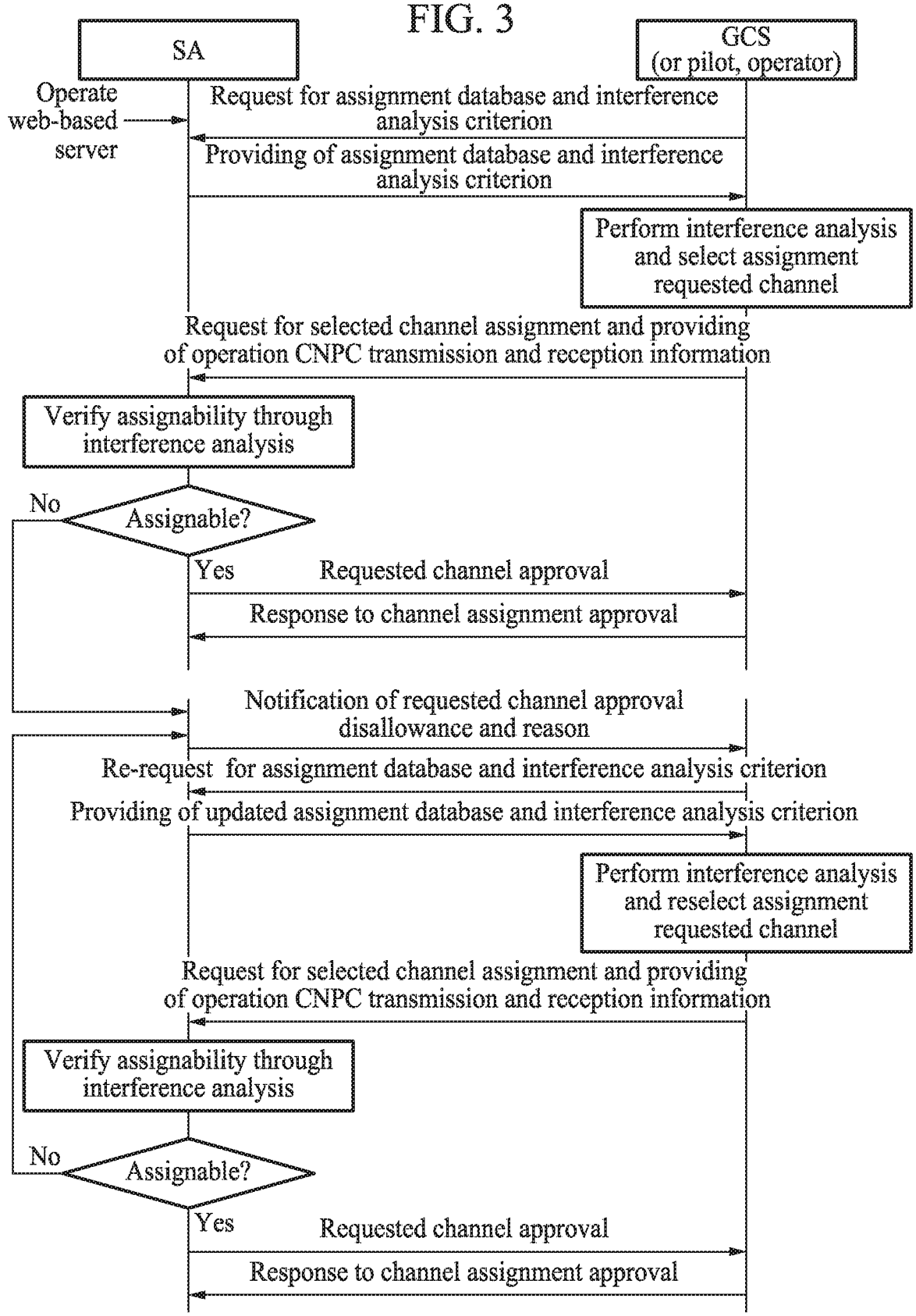
FIG. 3 illustrates an example of a process of assigning a distributive CNPC channel in a point-to-point (P2P) CNPC system according to example embodiments.

FIG. 3 illustrates an example of a process of assigning a distributive CNPC channel in a P2P CNPC system according to example embodiments.

Referring to FIG. 3, in the distributive CNPC channel assignment scheme of the P2P CNPC system, each GCS may analyze an available CNPC channel by considering a flight plan, a CNPC operation environment, etc., based on information provided from an SA and may request the SA for a single CNPC channel from a set of available CNPC channels. The SA may verify whether CNPC channels requested by each GCS may be safely used in the airspace and may determine whether to approve assignment of the requested CNPC channels. Priority between GCSs that desire to use a CNPC channel may be determined based on a first-come, first-served basis.

In the distributive CNPC channel assignment scheme, the SA operates a web-based channel assignment server and provides an assignment database (or assignment data) and an interference analysis criterion to the GCS through the channel assignment server.

The assignment database (or the assignment data) may include information regarding a center frequency and a bandwidth of a pre-assigned CNPC channel, a maximum transmission power, a reception sensitivity, a GRS location and communication coverage, and an antenna gain so that the GCS may perform an interference analysis and may select a CNPC channel. The selected CNPC channel may refer to a channel of which assignment is requested.

The provided interference analysis criterion may be applied for the SA to approve assignment of the channel requested by the GCS.

The GCS performs the interference analysis based on the assignment database (or the assignment data) and the interference analysis criterion provided from the channel assignment server, and selects a CNPC channel of which assignment is to be requested to the SA. The GCS requests the SA for the selected CNPC channel and provides transmission and reception information associated with a CNPC system to be operated through the selected CNPC channel.

The SA analyzes an interference effect against an existing operation CNPC channel based on operation CNPC transmission and reception source information that is provided from the GCS with respect to the requested channel. If the interference analysis criterion is met, the SA approves assignment of the channel requested by the GCS. If the channel requested by the GCS does not meet the interference analysis criterion due to a channel overlapping or due to another CNPC channel assigned between an interference analysis period of the GCS and an interference analysis period of the SA, the SA notifies the GCS of a requested channel approval disallowance and a reason thereof.

In response to the disallowance notification, the GCS reconnects to the channel assignment server, receives an updated assignment database (or assignment data), and performs again an interference analysis, channel selection, and assignment request, process. If a maximum number of channels that may be simultaneously maintained by a UAV is limited, for example, if two or three channels can be simultaneously maintained by the UAV, the GCS needs to return an existing CNPC channel and to request assignment of a new CNPC channel in response to a need for the new CNPC channel in a state in which the maximum number of channels are maintained. A procedure of returning an existing channel and assigning a new channel proceeds in the same manner as a remaining process after the GCS performs the interference analysis and selects a channel of which assignment is requested and then requests an assignment of the selected channel with a request for returning the existing channel in the CNPC channel assignment procedure of FIG. 3.

Figure 4:
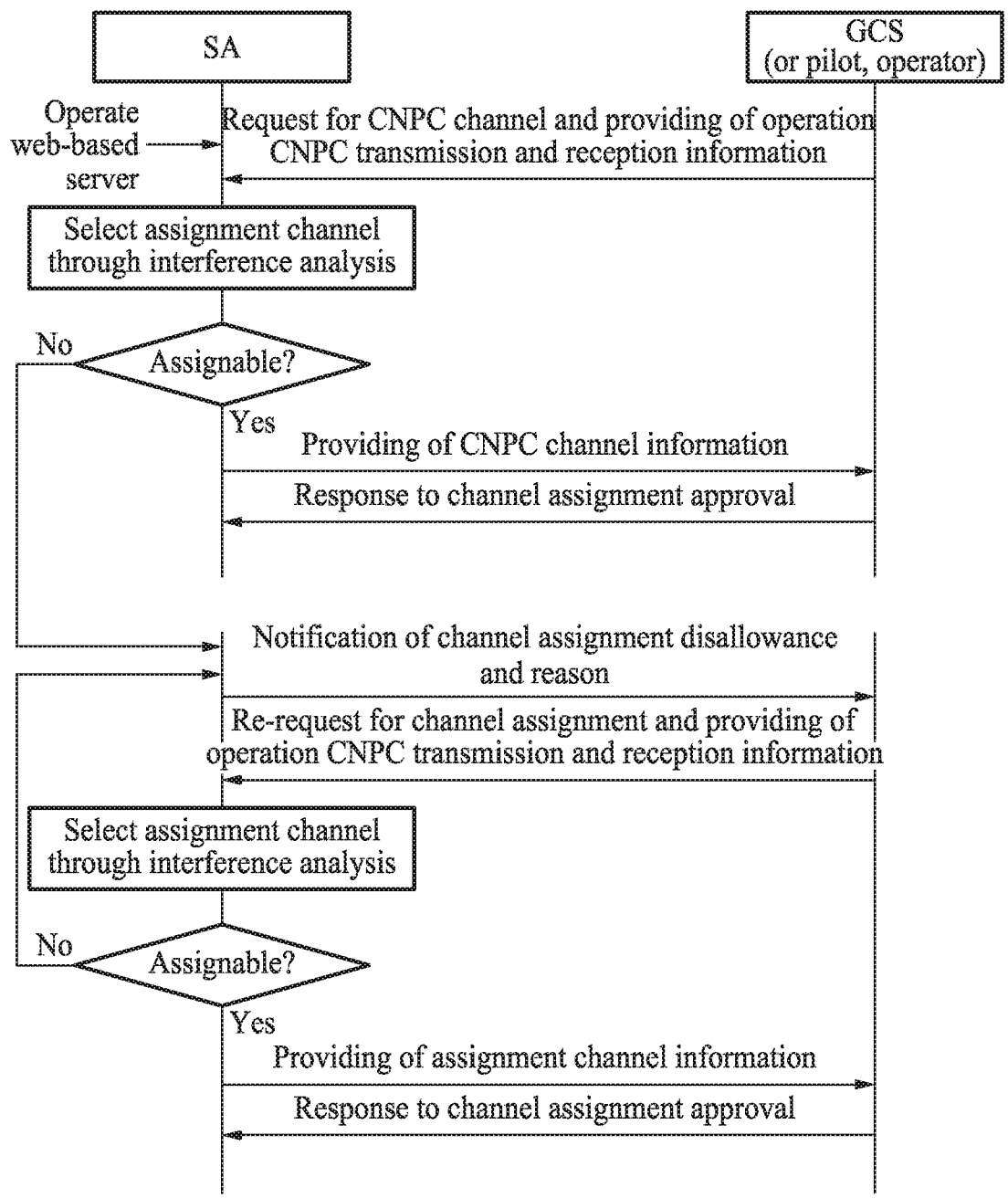
FIG. 4 illustrates an example of a process of assigning a central CNPC channel in a P2P CNPC system according to example embodiments.

FIG. 4 illustrates an example of a process of assigning a central CNPC channel in a P2P CNPC system according to example embodiments.

Referring to FIG. 4, in the central channel assignment scheme of the P2P CNPC system, an SA may analyze a channel based on flight plan and CNPC operation environment information that is provided from each GCS, and may assign a channel suitable for each GCS that requests a channel assignment. That is, in the distributive channel assignment scheme, the GCS performs the interference analysis and channel selection process. In the central channel assignment scheme, the SA performs the interference analysis and channel selection process. A further efficient assignment priority may be determined to optimally use a limited CNPC frequency. Here, the distributive channel assignment scheme uses a first-come, first-served scheme.

If a channel assignment is impossible, the SA needs to notify the GCS of a disallowance and a reason thereof in the central channel assignment scheme. The SA may notify the GCS of the reason, for example, that the channel assignment is difficult since a CNPC channel is saturated, that the channel assignment is difficult due to a serious interference situation, that the channel assignment is difficult due to a large number of simultaneously requesting GCSs, etc.

The GCS may update a flight plane, a CNPC characteristic, etc., to be advantageous for the channel assignment, based on information associated with the notification reason. When the GCS requests the channel assignment, information associated with an operation CNPC transmission and reception resource, for example, a center frequency, a bandwidth, a maximum transmission power, a reception sensitivity, a GRC location and communication coverage, an antenna gain, and the like, needs to be provided. Herein, the operation CNPC transmission and reception information may include information associated with the operation CNPC transmission and reception resource. The GCS provides operation CNPC transmission and reception information with the channel assignment request.

If the channel assignment is possible through an interference analysis with an existing channel, the SA may provide the selected channel to the GCS that requests the channel assignment based on first-come, first-served basis. If the channel assignment is impossible, the SA may provide a disallowance notification and a disallowance reason to the GCS.

The GCS verifies the disallowance reason, provides the updated operation CNPC transmission and reception information, and requests again the channel assignment. As described above, a maximum number of channels that may be simultaneously maintained by a UAV are limited. Thus, if a new channel is required, the GCS needs to return an existing channel and to request assignment of the new channel. A procedure of returning an existing channel and assigning a new channel proceeds in the same manner after the GCS requests the channel assignment and provides operation CNPC transmission and reception information with a request for returning the existing channel in the channel assignment procedure of FIG. 4.

Figure 5:
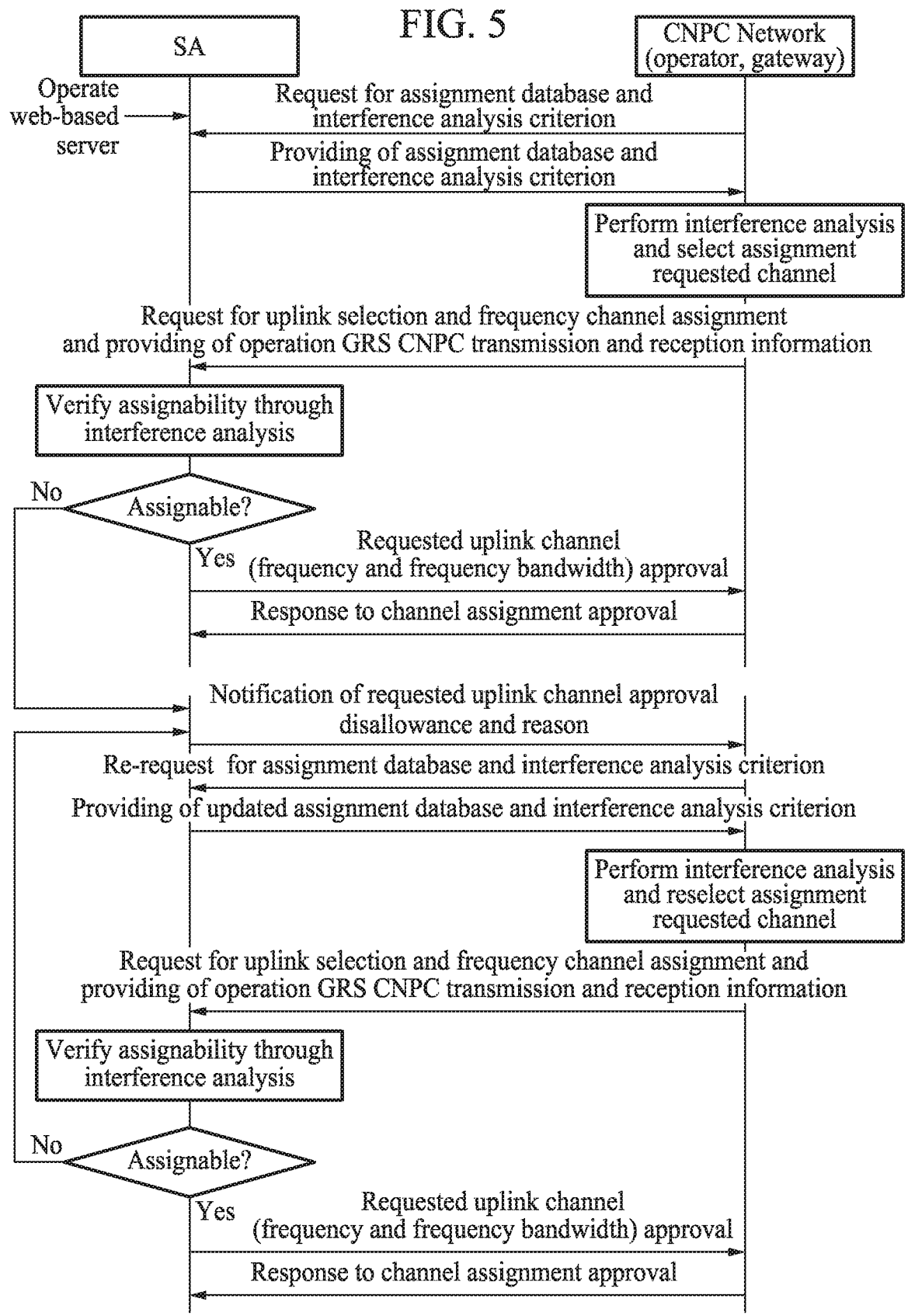
FIG. 5 illustrates an example of a process of assigning a distributive CNPC channel in a point-to-multipoint (P2MP) CNPC system according to example embodiments.

FIG. 5 illustrates an example of a process of assigning a distributive CNPC channel in a P2MP CNPC system according to example embodiments.

Referring to FIG. 5, the distributive CNPC channel assignment scheme of the P2MP CNPC system is basically similar to the aforementioned distributive CNPC channel assignment scheme of the P2P CNPC system. A CNPC channel assignment of the P2MP CNPC system is largely classified into assignment of an uplink frequency (a center frequency and a bandwidth) in a CNPC network, assignment of a downlink frequency (a center frequency and a bandwidth) in a GCS, and assignment of a number of uplink time slots and locations of uplink time slots.

In a P2MP type, a GRS does not belong to a single UAV system. Thus, an SA assigns, to a P2MP CNPC network operator, an uplink frequency (a center frequency and a bandwidth) to be used for the GRS when the P2MP CNPC network operator registers in advance GRS information to the SA. An uplink channel assignment procedure of the P2MP type is the same as the uplink channel assignment procedure of the P2P type. The GRS maintains N primary/backup uplink channels. Here, N generally has a value of 1, however, may have a value of 2 or more.

Figure 6:
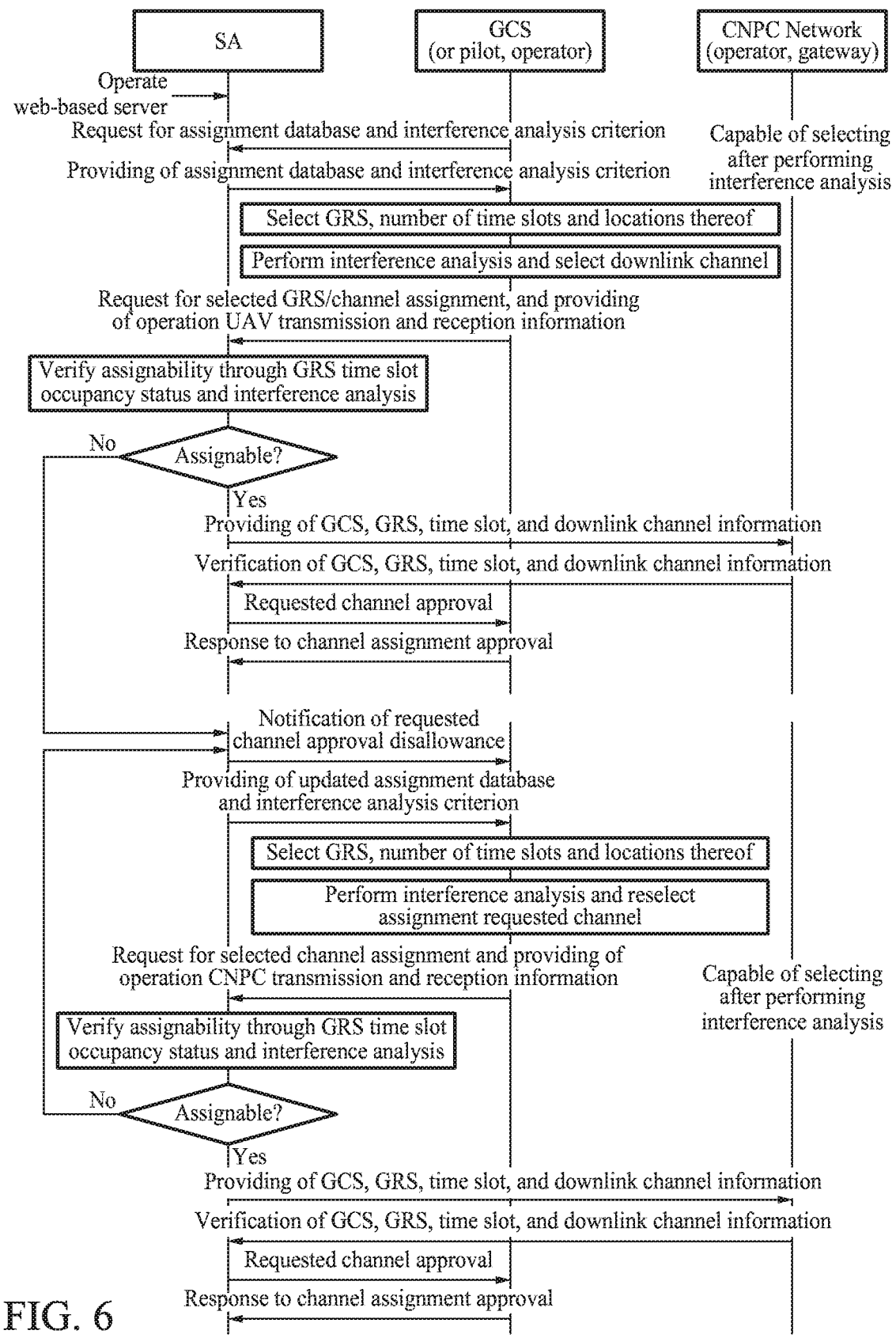
FIG. 6 illustrates another example of a process of assigning a distributive CNPC channel in a P2MP CNPC system according to example embodiments.

FIG. 6 illustrates another example of a process of assigning a distributive CNPC channel in a P2MP CNPC system according to example embodiments.

Referring to FIG. 6, in an uplink, a GCS selects GRSs used to operate an UAV from GRS information of a CNPC network that is registered in advance to an SA, acquires available time slot information in an uplink frequency assigned from the SA to the GRSs, from an assignment database (or assignment data) provided from the SA, and selects a number of time slots and locations of the time slots to be used through an interference analysis. Here, it is also to identify GRS information about a GRS that the GCS may connect to. In a downlink, the GCS performs an interference analysis and selects a downlink frequency in the same manner as in the P2P type.

The GCS provides the GRS information and requests the SA for the number/locations of uplink time slots and the downlink frequency. Here, the GCS also provides operation CNPC transmission and reception information to be operated.

The SA analyzes an interference effect against an existing CNPC channel based on the operation CNPC transmission and reception information that is provided in association with the downlink frequency and the number/locations of uplink time slots requested from the GCS, and determines whether to approve assignment of the requested downlink frequency and number/locations of uplink time slots. The SA approves assignment of the downlink frequency and the number/locations of uplink time slots selected by the GCS, and at the same time, provides channel assignment information to the CNPC network, for example, a mobility management entity (MME) through a gateway. In the case of an approval disallowance, the SA notifies the GCS of the disallowance and a reason thereof, and the GCS performs again an interference analysis and a channel selection based on an updated assignment database (or assignment data). FIG. 6 illustrates an example of a procedure of assigning a frequency of a downlink CNPC channel and a number/locations of uplink time slots based on the P2MP type.

Figure 7:
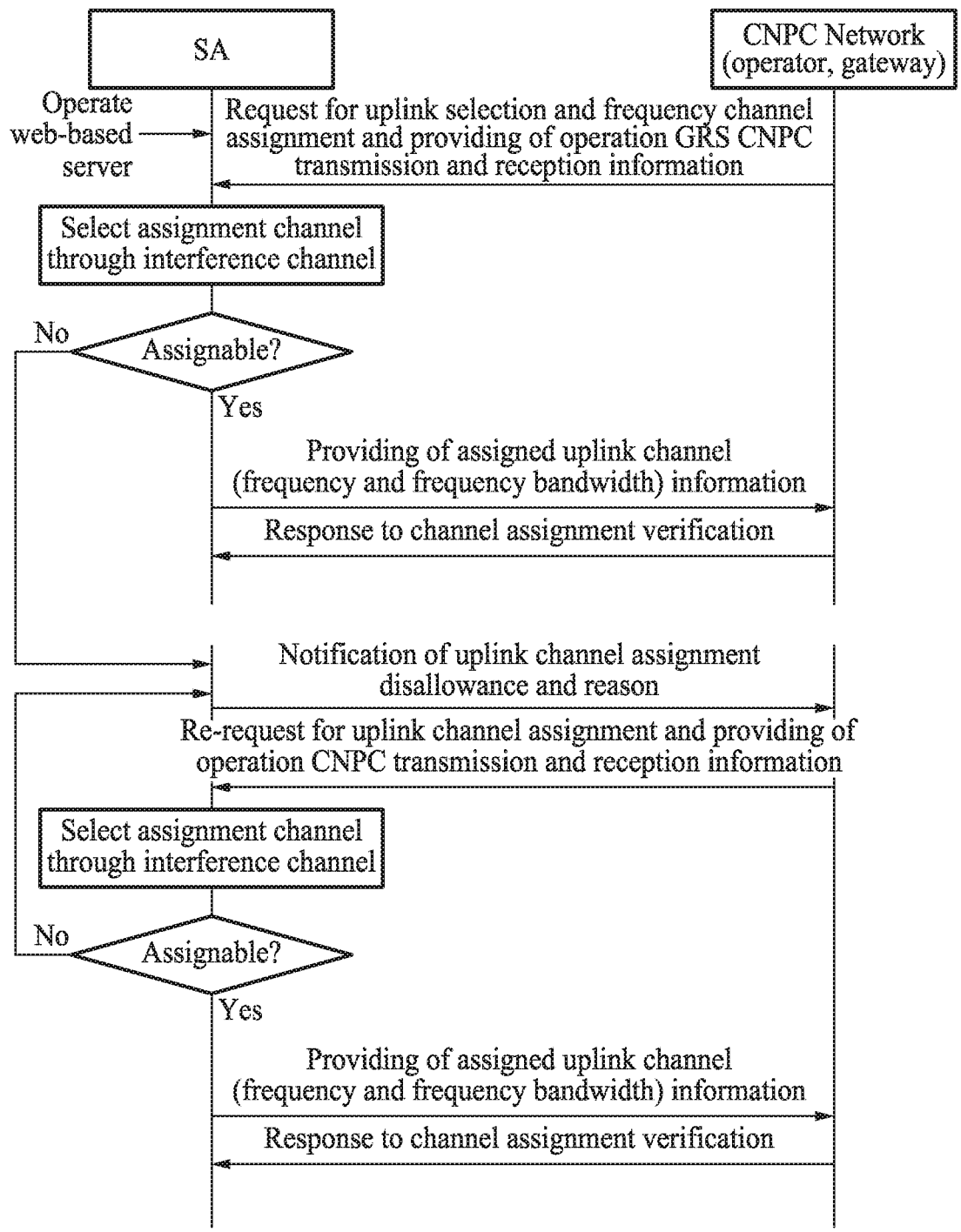
FIG. 7 illustrates an example of a process of assigning a central CNPC channel in a P2MP CNPC system according to example embodiments.

FIG. 7 illustrates an example of a process of assigning a central CNPC channel in a P2MP CNPC system according to example embodiments.

Referring to FIG. 7, the central CNPC channel assignment scheme of the P2MP CNPC system is basically similar to the aforementioned central CNPC channel assignment scheme of the P2P CNPC system. Here, a CNPC channel assignment of the P2MP CNPC system is largely classified into assignment of an uplink frequency (a center frequency and a bandwidth) in a CNPC network, assignment of a downlink frequency (a center frequency and a bandwidth) in a GCS, and a number/locations of uplink time slots.

In a P2MP type, a GRS does not belong to a single UAV system. Thus, an SA assigns, to a P2MP CNPC network operator, an uplink frequency (a center frequency and a bandwidth) to be used for the GRS when the P2MP CNPC network operator registers in advance GRS information to the SA. An uplink channel assignment procedure of the P2MP type is the same as the uplink channel assignment procedure of the P2P type. The GRS maintains N primary/backup channels. Here, N generally has a value of 1, however, may have a value of 2 or more.

Figure 8:
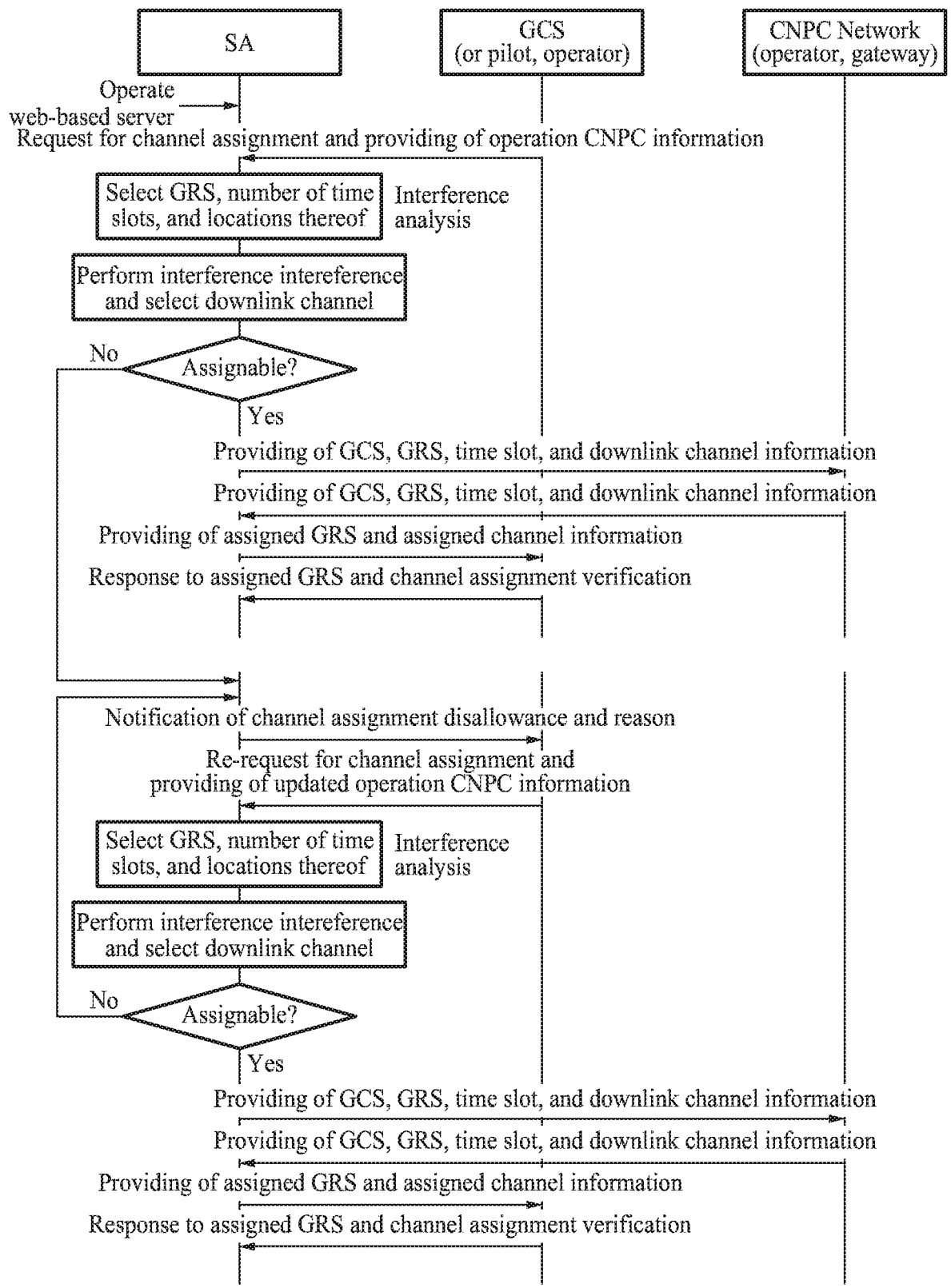
FIG. 8 illustrates another example of a process of assigning a central CNPC channel in a P2MP CNPC system according to example embodiments.

FIG. 8 illustrates another example of a process of assigning a central CNPC channel in a P2MP CNPC system according to example embodiments.

Referring to FIG. 8, a GCS requests an SA for assigning a CNPC channel downlink frequency (a center frequency and a bandwidth) and a number/locations of uplink time slots. Here, the GCS provides operation CNPC transmission and reception information.

The SA selects a GRS to be used in a CNPC network to which the GCS connects, a downlink frequency, and the number/locations of uplink time slots based on the operation CNPC transmission and reception information provided from the GCS, and provides the selected GRS, downlink frequency, and number/locations of uplink time slots to the GCS. The SA provides channel assignment information to the GCS and also provides the channel assignment information to the CNPC network, for example, an MME through a gateway. In the case of an approval disallowance, the SA notifies the GCS of the disallowance and a reason thereof, and the GCS requests again a channel assignment based on updated operation CNPC transmission and reception information. FIG. 8 illustrates an example of a procedure of assigning a downlink frequency and a number/locations of uplink time slots based on the P2MP type.

Hereinafter, a video channel assignment method of the UAV CNPC system 10 or 20 is described.

Figure 9:
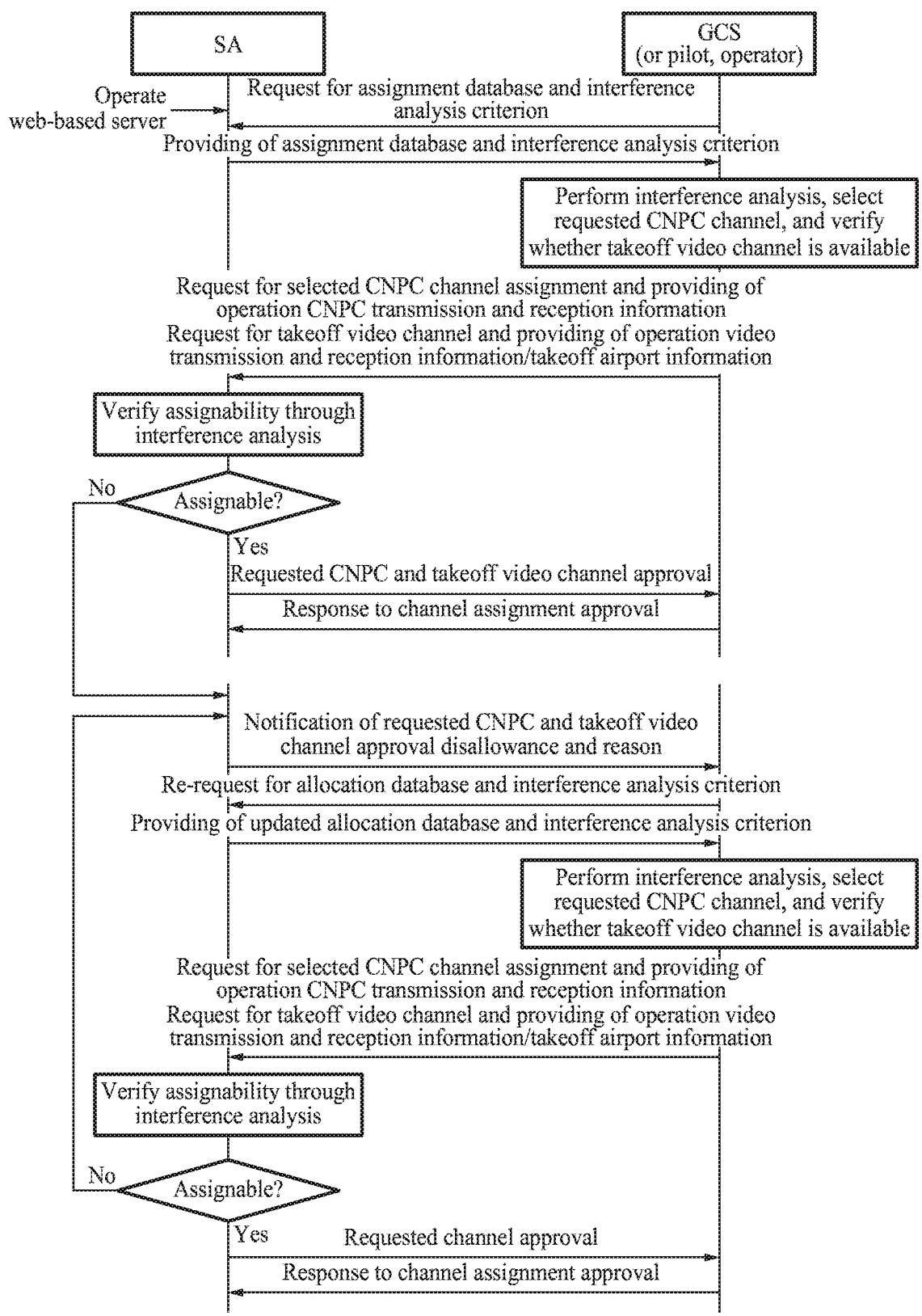
FIG. 9 illustrates an example of a process of assigning a video channel in a P2P CNPC system according to example embodiments.

FIG. 9 illustrates an example of a process of assigning a video channel in a P2P CNPC system according to example embodiments.

Referring to FIG. 9, a video channel may include a video channel for takeoff/landing (hereinafter, also referred to as a takeoff/landing video channel) and a video channel for emergency (hereinafter, also referred to as an emergency video channel). A radio technical commission for aeronautics (RTCA), CNPC, or minimum operational performance standard (MOPS) has assigned two takeoff/landing video channels and a single enroute emergency video channel in a C band as video channels available in the national airspace. The takeoff/landing video channels include a single video channel for takeoff and a single video channel for landing, and are used only for takeoff and landing of an UAV and retrieved after the takeoff or landing is completed. Accordingly, two channels are assigned in advance for each airport. Unless interference occurs as a result of interference analysis, the enroute emergency video channel may be reused.

In the case of a takeoff video channel, the SA assigns two channels for each airport as the takeoff/landing video channels. The GCS simultaneously requests the CNPC channel and the takeoff video channels within 20 minutes before takeoff. Since a single takeoff video channel is assigned for each airport, a relatively large amount of time may be used to receive an assignment of the takeoff video channel. Thus, if the CNPC channel is assigned first and a relatively large amount of time, for example, over 20 minutes is used until the video channel is assigned, the CNPC channel needs to be returned and reassigned. In this case, the video channel may be assigned first. The GCS verifies whether the video channel is available at an airport at which a takeoff is to be implemented based on video channel assignment database information provided from the SA, and requests the SA for assigning the video channel.

If the takeoff video channel is not in use, the SA immediately assigns the takeoff video channel to the GCS. On the contrary, if the takeoff video channel is in use, the SA assigns the video channel based on a first-come, first-served basis.

Once the takeoff video channel is assigned to the GCS, the corresponding GCS needs to implement takeoff within 20 minutes and thus, the video channel may be assigned to another GCS based on a unit of 20 minutes. Referring to FIG. 9, the video channel and the CNPC channel may be simultaneously assigned to the GCS. Alternatively, based on the assignment database (or the assignment data), the video channel may be initially assigned to the GCS and then the CNPC channel may be assigned to the GCS.

Herein, an example in which the CNPC channel and the takeoff video channel are simultaneously assigned to the GCS is described. Similar to the CNPC channel assignment scheme, in the distributive video channel assignment scheme, the SA operates a web-based channel assignment server and provides an assignment database (or assignment data) and an interference analysis criterion to the GCS through the channel assignment server. The assignment database (or the assignment data) for the takeoff video channel may include information regarding whether the takeoff video channel assigned in advance for each airport is available.

Herein, an example in which a single video channel for takeoff and a single video channel for landing are statically used as two takeoff/landing video channels to achieve smooth takeoff/landing of an UAV is described. However, it is provided as an example only. The example embodiment may be applicable to an example of two video channels for takeoff or two video channels for landing are simultaneously used as the two takeoff/landing video channels. Here, it is assumed that an additional interference analysis between the assigned takeoff/video channels is not required since the takeoff/landing video channels are assigned around airports that are separate from each other at a predetermined distance.

Referring to FIG. 9, for simultaneous assignment of the CNPC channel and the video channel, the GCS verifies whether the takeoff video channel is available by referring to a video channel assignment database. When the takeoff video channel is verified to be available, the GCS requests the SA for assigning the CNPC channel and the available takeoff video channel. When requesting the SA for the video channel, the GCS provides transmission and reception information associated with the video channel being used by the GCS and takeoff airport information so that the SA may verify whether the requested video channel is available without interference. The SA analyzes an interference effect against an existing operation CNPC channel and video channel based on the takeoff airport information and the video channel transmission and reception information provided from the GCS with respect to the requested video channel. If the interference reference is met, the SA approves assignment of the video channel and the CNPC channel requested by the GCS. If the video channel requested by the GCS overlaps or if the video channel transmission and reception information of the GCS does not meet the interference analysis criterion, the SA notifies the GCS of a disallowance of approving assignment of the requested CNPC channel and video channel and a reason thereof. The disallowance notification is to notify information associated with a channel corresponding to the approval disallowance between the CNPC channel and the video channel and a reason thereof.

In response to the disallowance notification, the GCS reconnects to the channel assignment server, receives an updated assignment database (or assignment data), performs again a CNPC channel interference analysis, verifies whether the takeoff video channel is available, and performs again a CNPC/takeoff video channel assignment request and channel selection process.

Figure 10:
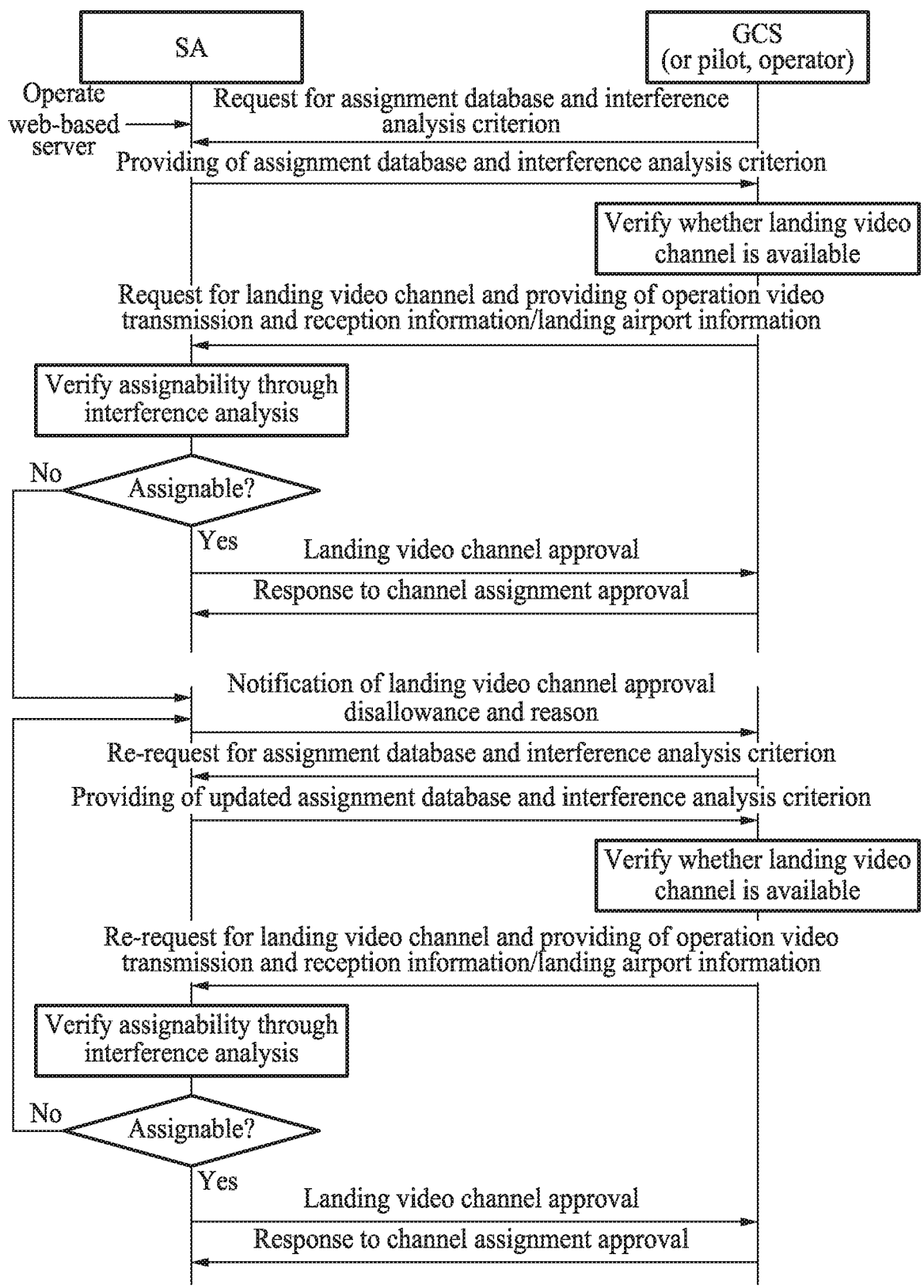
FIG. 10 illustrates another example of a process of assigning a video channel in a P2P CNPC system according to example embodiments.

FIG. 10 illustrates another example of a process of assigning a video channel in a P2P CNPC system according to example embodiments.

Hereinafter, a distributive landing video channel assignment process of the P2P CNPC system is described with reference to FIG. 10.

Referring to FIG. 10, a GCS provides information about an airport at which an UAV is to land within 20 minutes before landing while operating the UAV through a CNPC channel and also requests a landing video channel. The landing video channel assignment process is similar to the aforementioned takeoff video channel assignment process. However, dissimilar thereto, the SA assigns the landing video channel separately to the GCS instead of simultaneously assigning the CNPC channel and the landing video channel.

Figure 11:
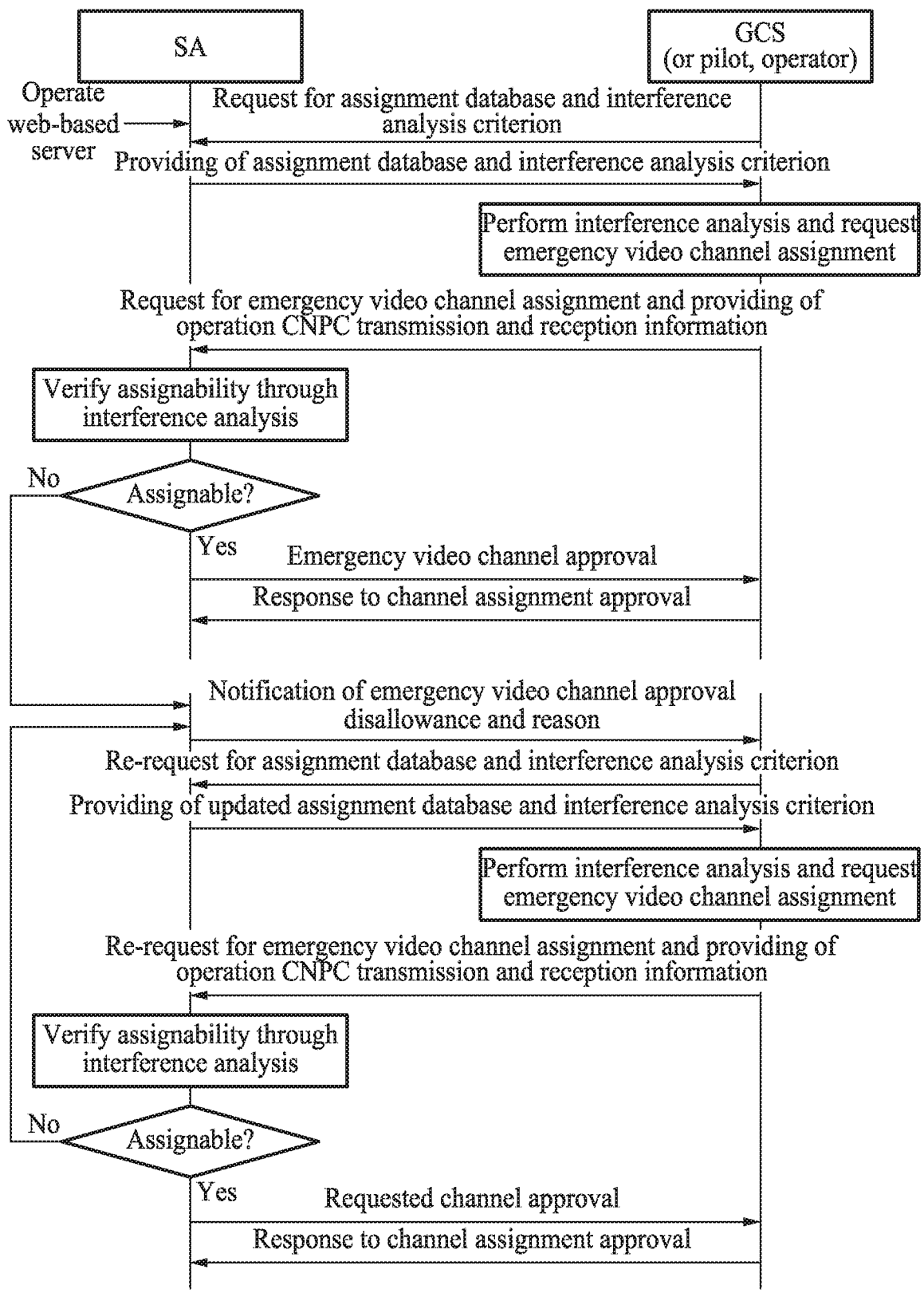
FIG. 11 illustrates another example of a process of assigning a video channel in a P2P CNPC system according to example embodiments.

FIG. 11 illustrates another example of a process of assigning a video channel in a P2P CNPC system according to example embodiments.

Hereinafter, a distributive channel assignment process between an SA and a GCS with respect to an emergency video channel is described with reference to FIG. 11.

A difference between a P2P distributive channel assignment process and a P2P central channel assignment process with respect to a takeoff video channel, a landing video channel, and an emergency video channel is the same as the aforementioned difference between the distributive channel assignment process and the central channel assignment process with respect to the CNPC channel.

Figure 12:
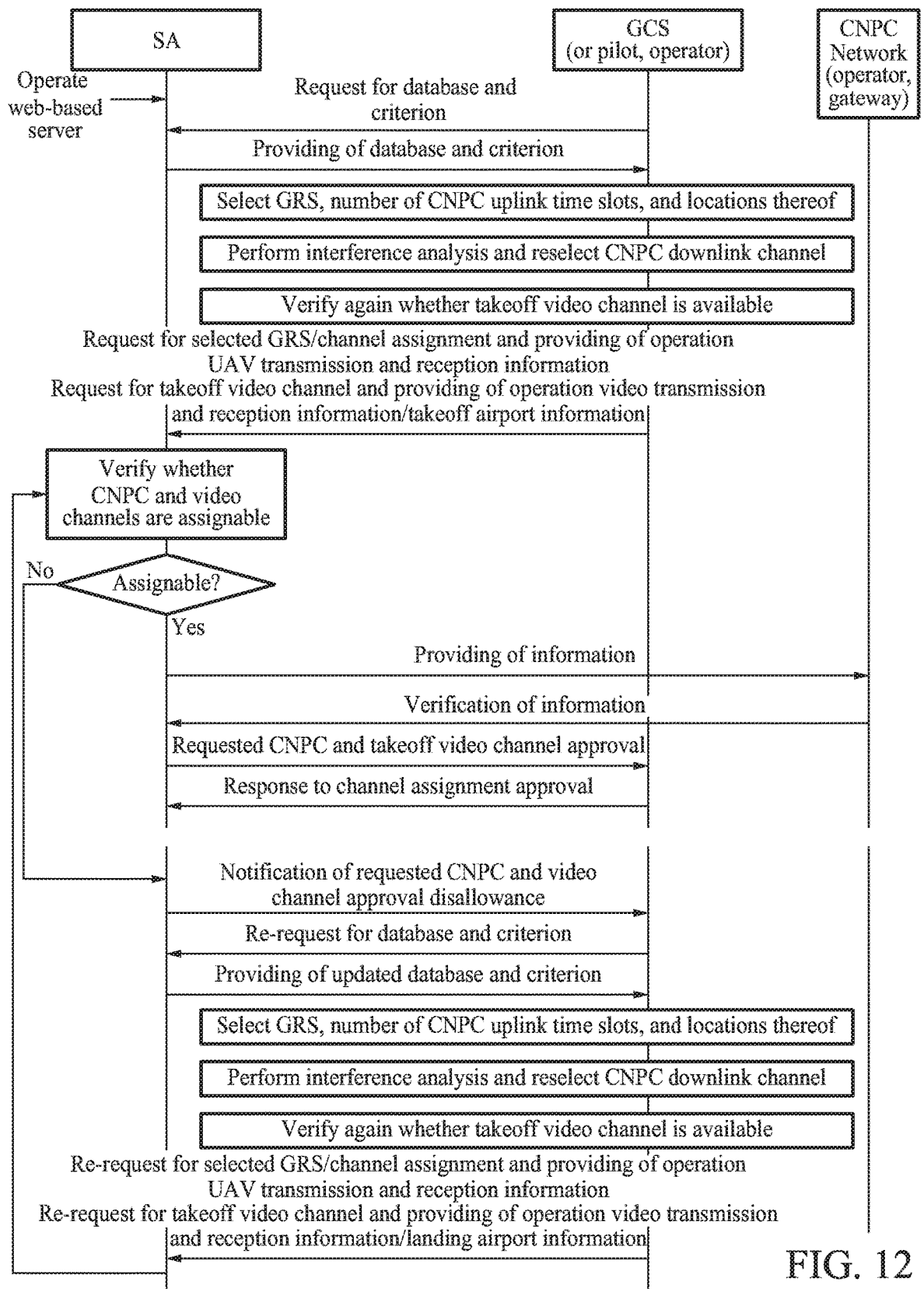
FIG. 12 illustrates an example of a process of assigning a video channel in a P2MP CNPC system according to example embodiments.

FIG. 12 illustrates an example of a process of assigning a video channel in a P2MP CNPC system according to example embodiments.

Referring to FIG. 12, dissimilar to the CNPC channel assignment process, in a takeoff video channel assignment process of the P2MP CNPC system, only a downlink frequency channel is present and an uplink frequency channel is absent with respect to a video channel. The terms "channel" and "frequency channel" used herein may be interchangeably used throughout.

Accordingly, a process of assigning an uplink frequency to a CNPC network is not performed. Similar to a P2P type, only a channel assignment process between an SA and a GCS is performed. A takeoff video channel assignment process between the SA and the GCS is similar to the P2P distributive takeoff video channel assignment process. However, the P2MP CNPC system performs an additional process in which the SA provides assigned video channel information to the CNPC network, which is the same as the channel assignment process between the SA and the GCS with respect to the P2MP CNPC channel FIG. 12 illustrates the takeoff video channel assignment process of the P2MP CNPC system. As described above with the P2P type, the takeoff video channel is assigned with the CNPC channel before takeoff.

Figure 13:
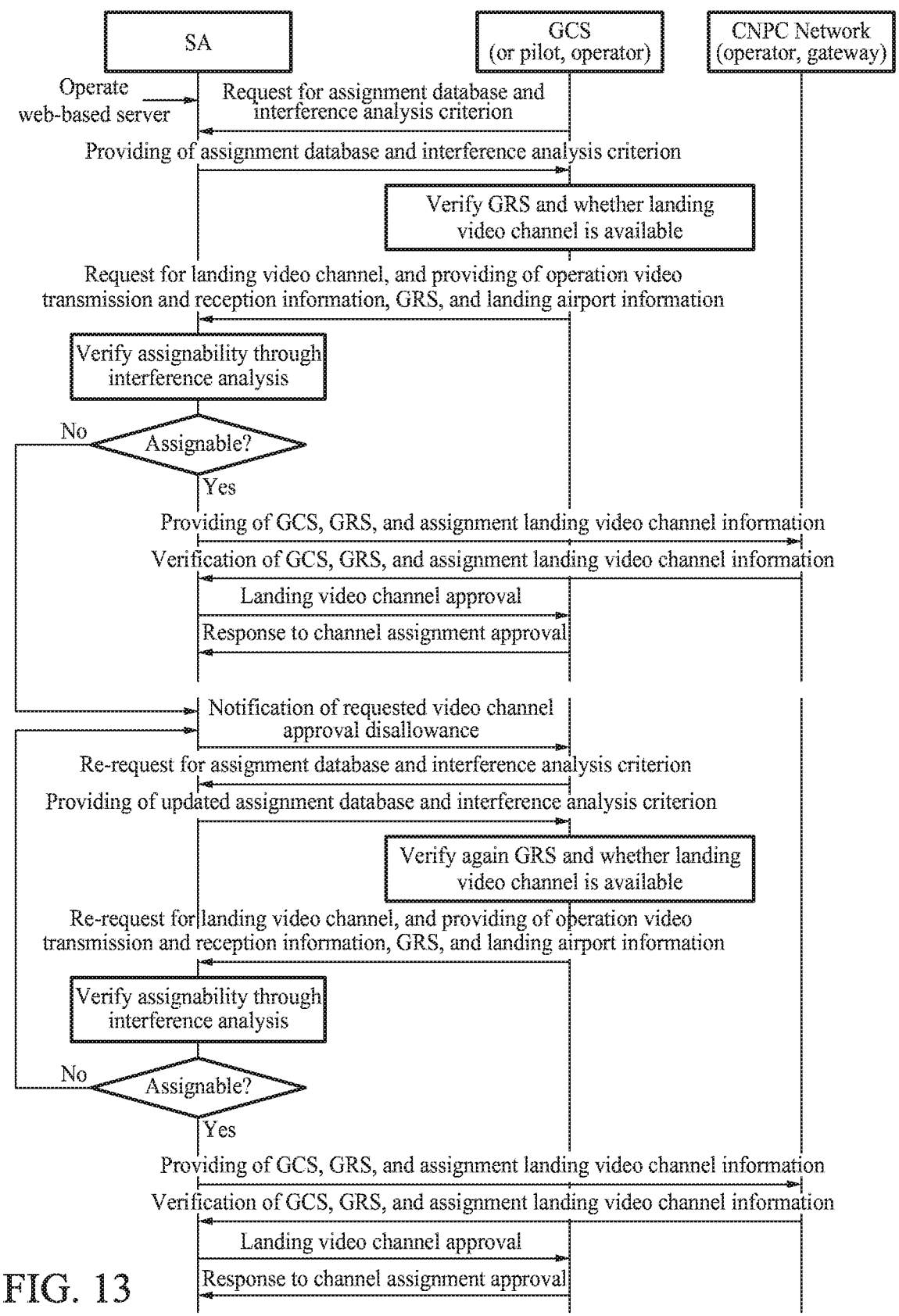
FIG. 13 illustrates another example of a process of assigning a video channel in a P2MP CNPC system according to example embodiments.

FIG. 13 illustrates another example of a process of assigning a video channel in a P2MP CNPC system according to example embodiments.

Referring to FIG. 13, dissimilar to the CNPC channel assignment process, in a landing video channel assignment process of the P2MP CNPC system, only a downlink frequency channel is present and an uplink frequency channel is absent with respect to a video channel. Accordingly, similar to the P2P type, a process of assigning an uplink frequency to a CNPC network is not performed. Only a channel assignment process between an SA and a GCS is performed. A landing video channel assignment process between the SA and the GCS is similar to the P2P distributive landing video channel assignment process. However, the P2MP CNPC system performs an additional process in which the SA provides assigned video channel information to the CNPC network, which is the same as the channel assignment process between the SA and the GCS with respect to the P2MP CNPC channel. FIG. 13 illustrates the landing video channel assignment process of the P2MP CNPC system. As described above with the P2P type, the landing video channel is assigned separate from the CNPC channel before landing.

Figure 14:
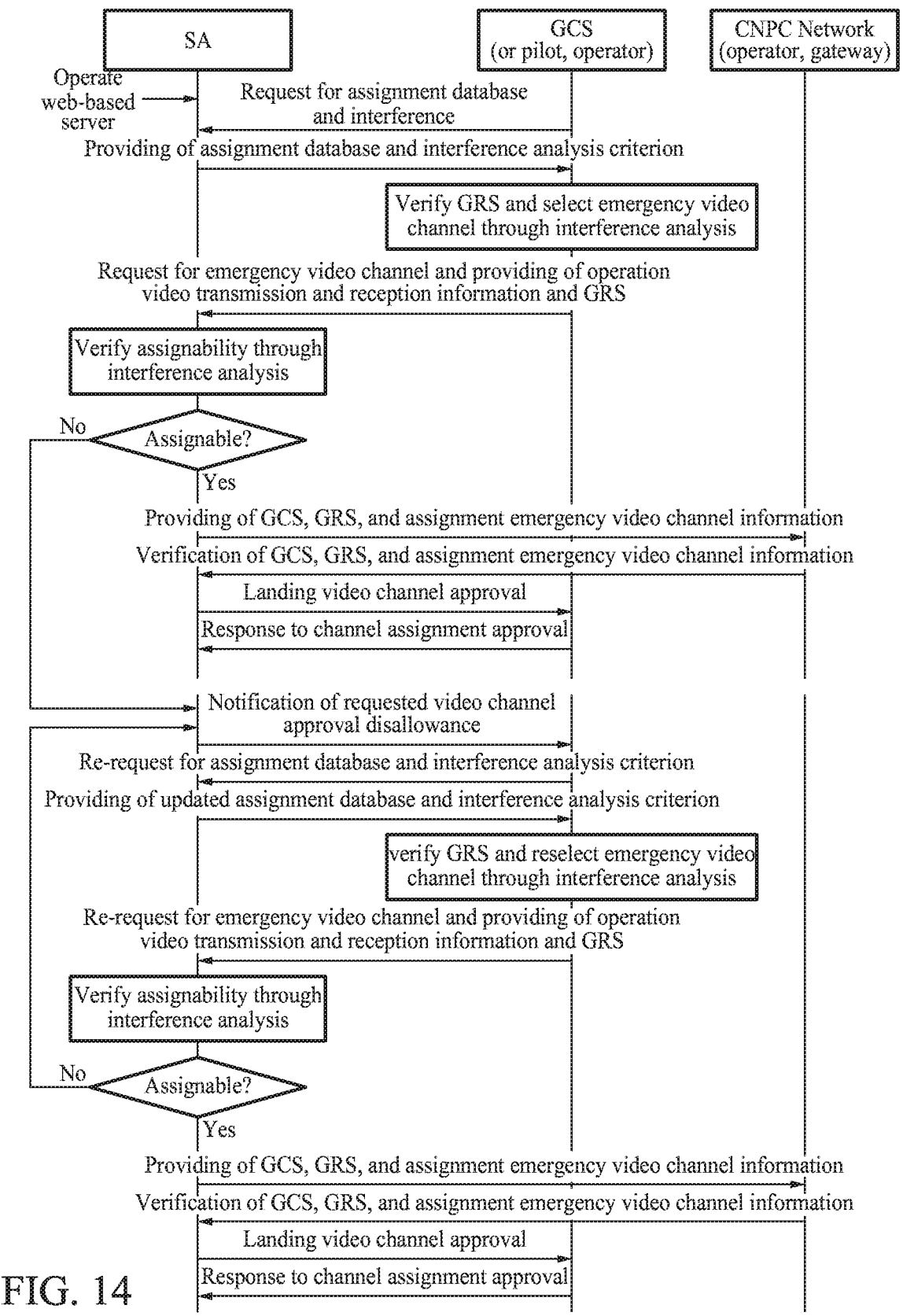
FIG. 14 illustrates another example of a process of assigning a video channel in a P2MP CNPC system according to example embodiments.

FIG. 14 illustrates another example of a process of assigning a video channel in a P2MP CNPC system according to example embodiments.

Referring to FIG. 14, dissimilar to the CNPC channel assignment process, in an emergency video channel assignment process of the P2MP CNPC system, only a downlink frequency channel is present and an uplink frequency channel is absent with respect to a video channel. Accordingly, a process of assigning an uplink frequency to a CNPC network is not performed. Similar to a P2P type, only a channel assignment process between an SA and a GCS is performed. A landing video channel assignment process between the SA and the GCS is similar to the P2P distributive emergency video channel assignment process. However, the P2MP CNPC system performs an additional process in which the SA provides assigned video channel information to the CNPC network, which is the same as the channel assignment process between the SA and the GCS with respect to the P2MP CNPC channel FIG. 14 illustrates the landing video channel assignment process of the P2MP CNPC system. As described with the P2P type, the emergency video channel is only one and thus, needs to be reused through an interference analysis.

A difference between a P2MP distributive channel assignment process and a P2MP central channel assignment process with respect to a takeoff video channel, a landing video channel, and an emergency video channel is the same as the aforementioned difference between the distributive channel assignment process and the central channel assignment process with respect to the CNPC channel.

Hereinafter, a process of substantially assigning, changing, reassigning, and returning a CNPC channel and a video channel during an operation period of an actual UAV CNPC system is described.

Figure 15:
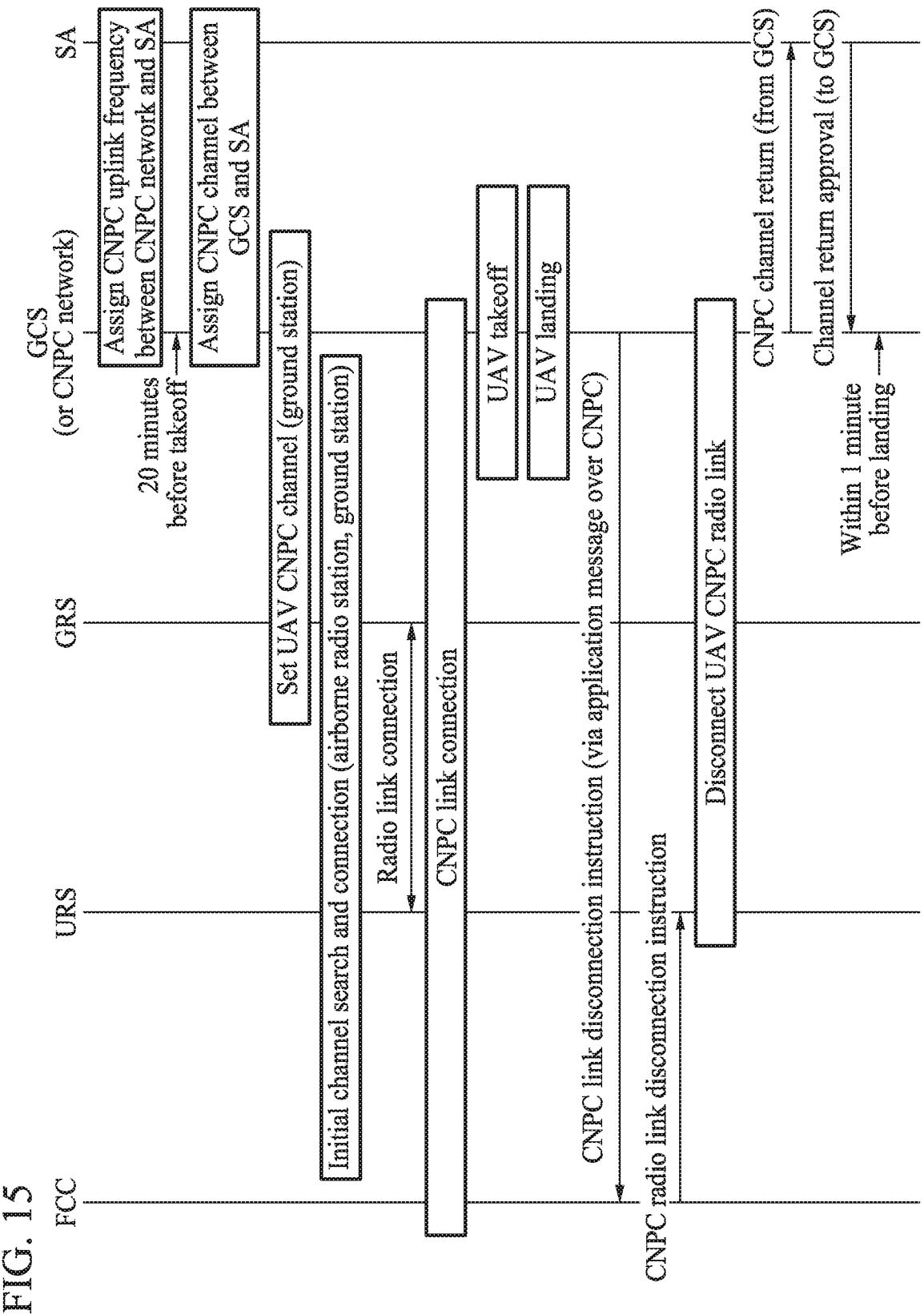
FIG. 15 illustrates an example of a channel assignment process during an operation period of an UAV CNPC system according to example embodiments.

FIG. 15 illustrates an example of a channel assignment process during an operation period of an UAV CNPC system according to example embodiments.

FIG. 15 illustrates an example of a procedure of initially assigning a CNPC channel before takeoff and returning the CNPC channel after landing. In a P2MP type, an uplink TDM channel of each GRS is assigned in advance to a CNPC network provider when constructing a network. Thus, a frequency of the uplink TDM channel may be assigned.

A CNPC uplink frequency assignment process between an SA and a CNPC network follows the aforementioned channel assignment process between the SA and the GCS based on a distributive channel assignment and a central channel assignment. The SA initially assigns a CNPC channel to a GCS that desires to operate an UAV 20 minutes before takeoff.

In a P2P type, the SA assigns an uplink FDMA channel and a downlink FDMA channel to the GCS. In a P2MP type, the SA assigns, to the GCS, a downlink FDMA frequency channel and a time slot of the uplink TDM frequency channel assigned in advance from the SA to the CNPC network.

A CNPC channel assignment process between the GCS and the SA in the P2P type follows the aforementioned channel assignment process between the SA and the GCS based on the distributive channel assignment and the central channel assignment. Also, the CNPC channel assignment process between the GCS and the SA in the P2MP type follows the aforementioned channel assignment process between the SA and the GCS based on the distributive channel assignment and the central channel assignment. Once the channel assignment between the GCS and the SA is completed 20 minutes before takeoff according to the process, channel setting of a GRS is performed using the assigned CNPC channel. In the case of a standalone type, the GCS performs the channel setting. In the case of a network type, the CNPC network performs the channel setting.

Once the channel setting of the GRS is completed, the GRS and a URS connect a radio link to the corresponding CNPC channel through an initial channel search and connection process, and a CNPC link is connected between a flight control computer (FCC) and the GCS through the connected radio link. The GCS starts to control the UAV for takeoff through the connected CNPC link.

When the GCS completes the takeoff after operating the UAV through the connected CNPC link, the GCS instructs the FCC to disconnect the CNPC link and in response thereto, the FCC instructs the URS to disconnect the CNPC link. The terms "CNPC link" and "CNPC radio link" used herein may be interchangeably used throughout.

In response thereto, the URS cancels the CNPC link connection between the GRS-(CNPC network)-GCS.

Once the disconnection of the CNPC link is completed, the GCS returns an emergency video channel within 1 minute after takeoff.

Figure 16:
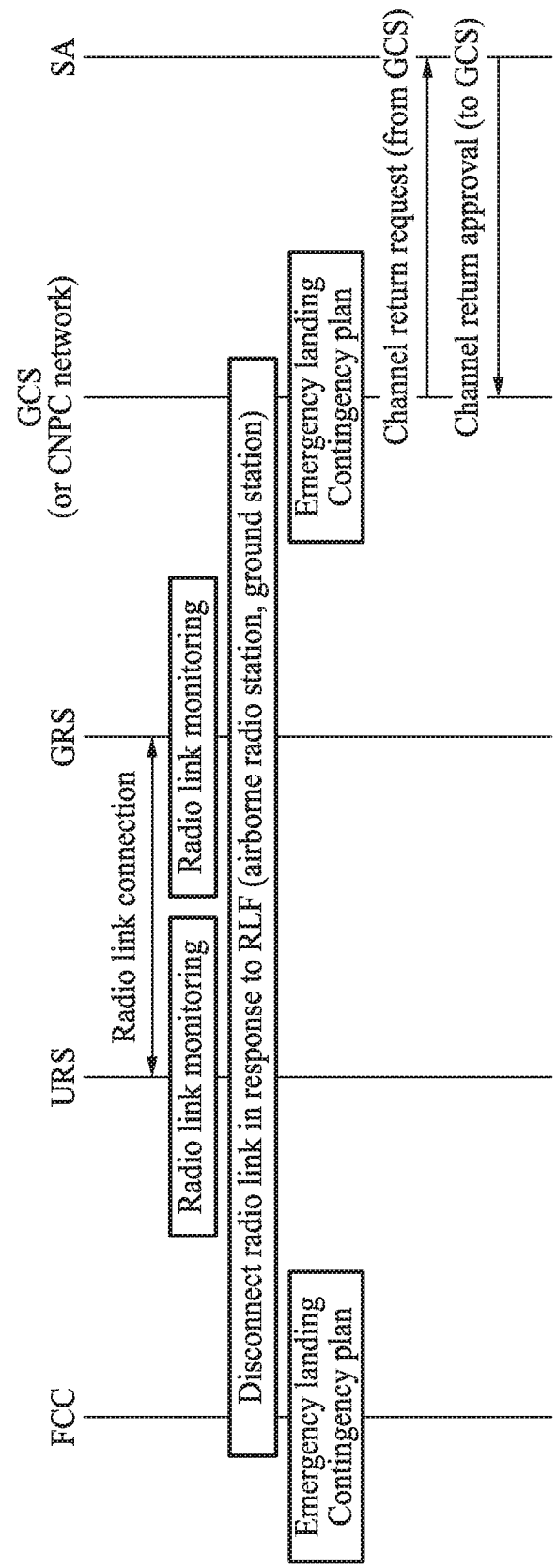
FIG. 16 illustrates another example of a channel assignment process during an operation period of an UAV CNPC system according to example embodiments.

FIG. 16 illustrates another example of a channel assignment process during an operation period of an UAV CNPC system according to example embodiments.

FIG. 16 illustrates a procedure of returning a channel in response to an occurrence of a CNPC radio link failure (RLF) during an operation of an UAV.

In response to the occurrence of the CNPC RLF, a UAV performs a radio link recovery procedure while performing a predetermined contingency plan such as an emergency turn, a flight to a last waypoint, and the like. If it is difficult to recover a radio link, the radio link is disconnected. Since a channel is not reassigned to a GCS, the UAV with which the CNPC connection is disconnected performs a contingency plan for emergency landing and the GCS returns the assigned channel to an SA.

Figure 17:
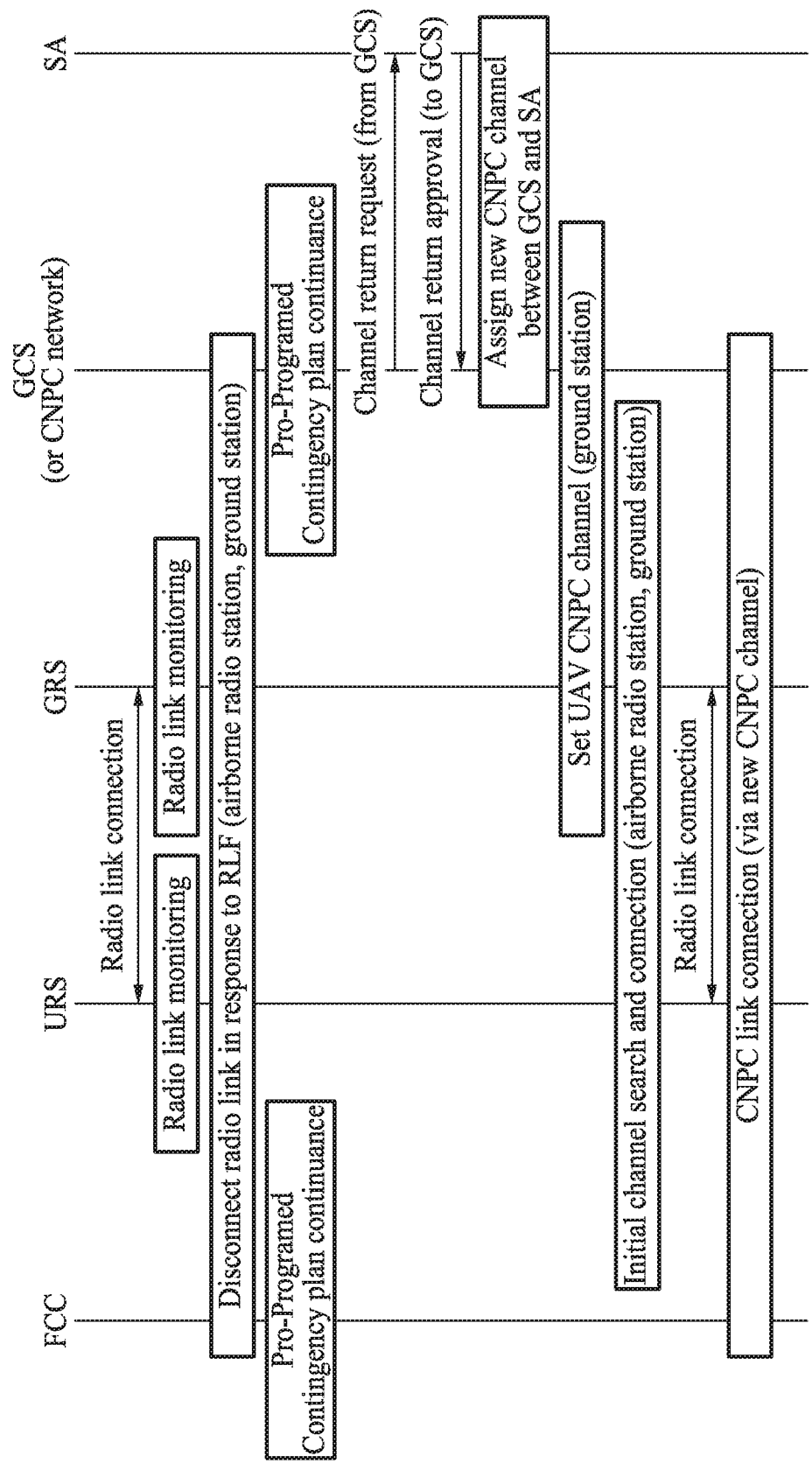
FIG. 17 illustrates another example of a channel assignment process during an operation period of an UAV CNPC system according to example embodiments.

FIG. 17 illustrates another example of a channel assignment process during an operation period of an UAV CNPC system according to example embodiments.

FIG. 17 illustrates a channel reassignment procedure in response to an occurrence of a CNPC RLF during an operation of an UAV.

In response to the occurrence of the CNPC RLF, a UAV performs a radio link recovery procedure while performing a predetermined contingency plan such as an emergency turn, a flight to a last waypoint, and the like. If it is difficult to recover a radio link, the radio link is disconnected. While a GCS and an FCC is performing the predetermined contingency plan, the GCS verifies the disconnection of the radio link and returns an existing channel. An SA assigns a new CNPC channel to the GCS.

Here, similar to the initial channel assignment procedure, in the case of the assignment procedure of the new CNPC channel, the CNPC channel assignment between the GCS and the SA in the P2P type and the CNPC channel assignment between the GCS and the SA in the P2MP type follow the aforementioned channel assignment process between the GCS and the SA based on the distributive channel assignment and the central channel assignment.

In the P2P type, the SA assigns an uplink FDMA channel and a downlink FDMA channel to the GCS. In the P2MP type, the GCS receives a downlink FDMA frequency channel and a time slot of an uplink TDM frequency channel assigned from the SA to the CNPC network.

Once the channel assignment between the GCS and the SA is completed, channel setting of a GRS is performed using the assigned CNPC channel. In the case of a standalone type, the GCS performs the channel setting. In the case of a network type, the CNPC network performs the channel setting. Once the channel setting of the GRS is completed, the GRS and a URS connect a radio link to the corresponding new CNPC channel through an initial channel search and connection process, and a CNPC link is connected between an FCC and the GCS through the connected radio link. The GCS restarts to control the UAV for takeoff through the newly connected CNPC link.

Although the GCS fails in a channel reassignment during a preprogrammed contingency plan time, the channel return procedure performed in response to the RLF of FIG. 16 may be applied. That is, the GCS and the FCC enter into an emergency landing contingency plan and the GCS performs a procedure of returning an existing channel.

Figure 18:
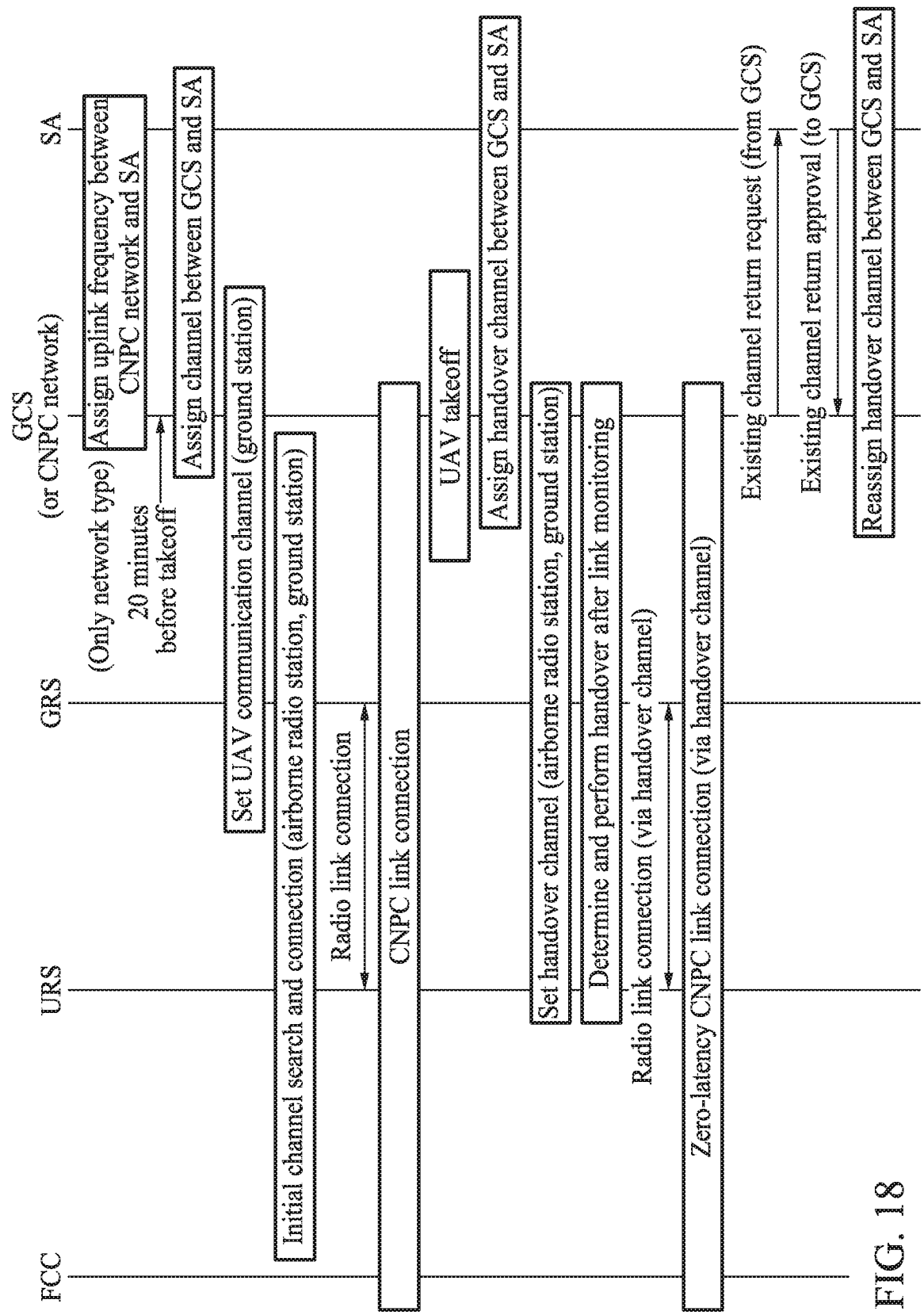
FIG. 18 illustrates another example of a channel assignment process during an operation period of an UAV CNPC system according to example embodiments.

FIG. 18 illustrates another example of a channel assignment process during an operation period of an UAV CNPC system according to example embodiments.

FIG. 18 illustrates a channel assignment and return procedure performed in response to an intra-cell handover indicating a handover within the same cell in a case in which a handover channel is assigned.

A procedure in which an SA assigns a channel to a GCS 20 minutes before takeoff and the GCS forms a CNPC link is the same as the aforementioned initial channel assignment procedure before takeoff. Once a UAV takes off under the UAV control through the connected CNPC link, the SA assigns a channel for intra-cell handover to the GCS. Here, similar to the initial CNPC channel assignment procedure, in the case of the assignment procedure of the CNPC channel for intra-cell handover, the CNPC channel assignment between the GCS and the SA in the P2P type and the CNPC channel assignment between the GCS and the SA in the P2MP type follow the aforementioned channel assignment process between the GCS and the SA based on the distributive channel assignment and the central channel assignment.

In the P2P type, the SA assigns an uplink FDMA channel and a downlink FDMA channel to the GCS. In the P2MP type, the GCS receives a downlink FDMA frequency channel and a time slot of an uplink TDM frequency channel assigned from the SA to the CNPC network.

A URS and a GRS set the handover channel assigned to the GCS. The GCS (in the case of a standalone type) or the CNPC network (in the case of a network type) determines whether to perform a handover based on an existing CNPC link monitoring result of the URS. The URS and the GCS perform the handover and change a channel to the set handover channel. Through this, the URS and the GRS connect a radio link to the CNPC channel for handover, and a handover channel based CNPC link is connected between an FCC and the GCS through the connected radio link.

Once the connection of the CNPC link is completed, the GCS performs a procedure of returning an existing channel and a new handover channel is assigned to the GCS. Here, similar to the initial CNPC channel assignment procedure, in the case of the assignment procedure of the CNPC channel for intra-cell handover, the CNPC channel assignment between the GCS and the SA in the P2P type and the CNPC channel assignment between the GCS and the SA in the P2MP type follow the aforementioned channel assignment process between the GCS and the SA based on the distributive channel assignment and the central channel assignment.

The new handover channel may not be assigned to the GCS. Whether to reassign the new handover channel may be determined by the GCS based on the stability of UAV system operation, channel assignment cost, and the like.

Figure 19:
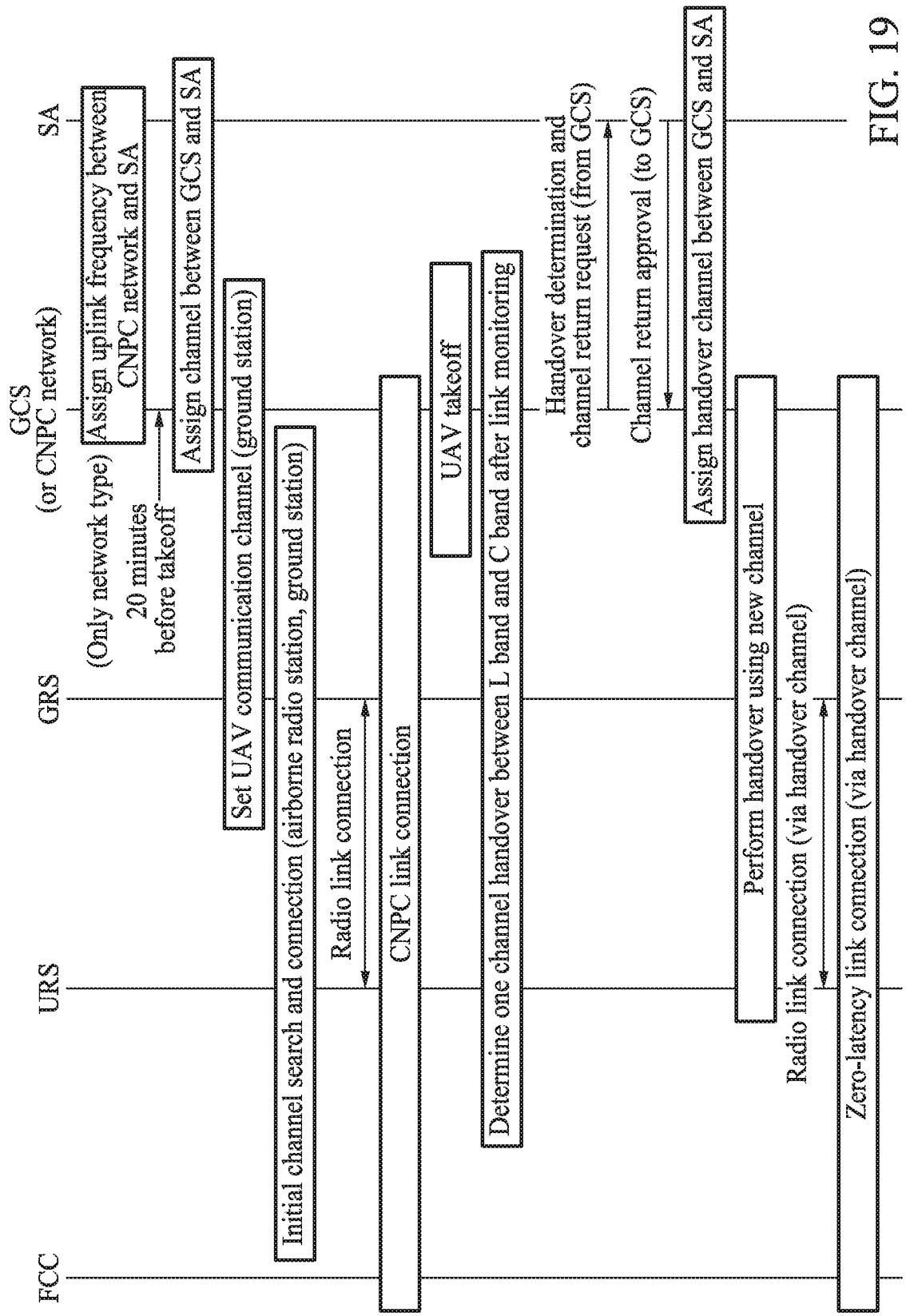
FIG. 19 illustrates another example of a channel assignment process during an operation period of an UAV CNPC system according to example embodiments.

FIG. 19 illustrates another example of a channel assignment process during an operation period of an UAV CNPC system according to example embodiments.

FIG. 19 illustrates a channel assignment and return procedure performed in response to an intra-cell handover in a case in which a handover channel is not assigned.

The intra-cell handover in a case in which the handover channel is not assigned is considered in a case in which a URS and a GRS operate in a dual band including an L band and a C band, and only one of an L band channel and a C band channel is to be changed due to a poor link status. When all of the L band channel and the C band channel have a poor link status and, in this instance, the handover channel is not assigned in advance, a zero-latency handover may not be readily performed due to a delay caused by channel assignment between the GCS and the SA.

A procedure in which the SA assigns a channel to the GCS 20 minutes before takeoff and the GCS forms the CNPC link is the same as the aforementioned initial channel assignment procedure before takeoff. When the UAV takes off and one of the L band and the C band has a poor link status based on an existing CNPC L/C band link monitoring result of the URS, the GCS (in the case of a standalone type) or the CNPC network (in the case of a network type) determines to perform a channel handover with respect to one of the L band and the C band.

The GCS returns the channel of which the handover is determined to the SA and a new channel is assigned to the GCS in a corresponding band. Here, similar to the initial CNPC channel assignment procedure, in the case of a single CNPC channel assignment procedure between the L band and the C band for intra-cell handover, the CNPC channel assignment between the GCS and the SA in the P2P type and the CNPC channel assignment between the GCS and the SA in the P2MP type follow the aforementioned channel assignment process between the GCS and the SA based on the distributive channel assignment and the central channel assignment.

The URS and the GRS change a channel based on the assigned single handover CNPC channel between the L band and the C band. The URS and the GRS connect a radio link to the handover CNPC channel and a handover channel based CNPC link is connected between an FCC and the GCS through the connected radio link.

Figure 20:
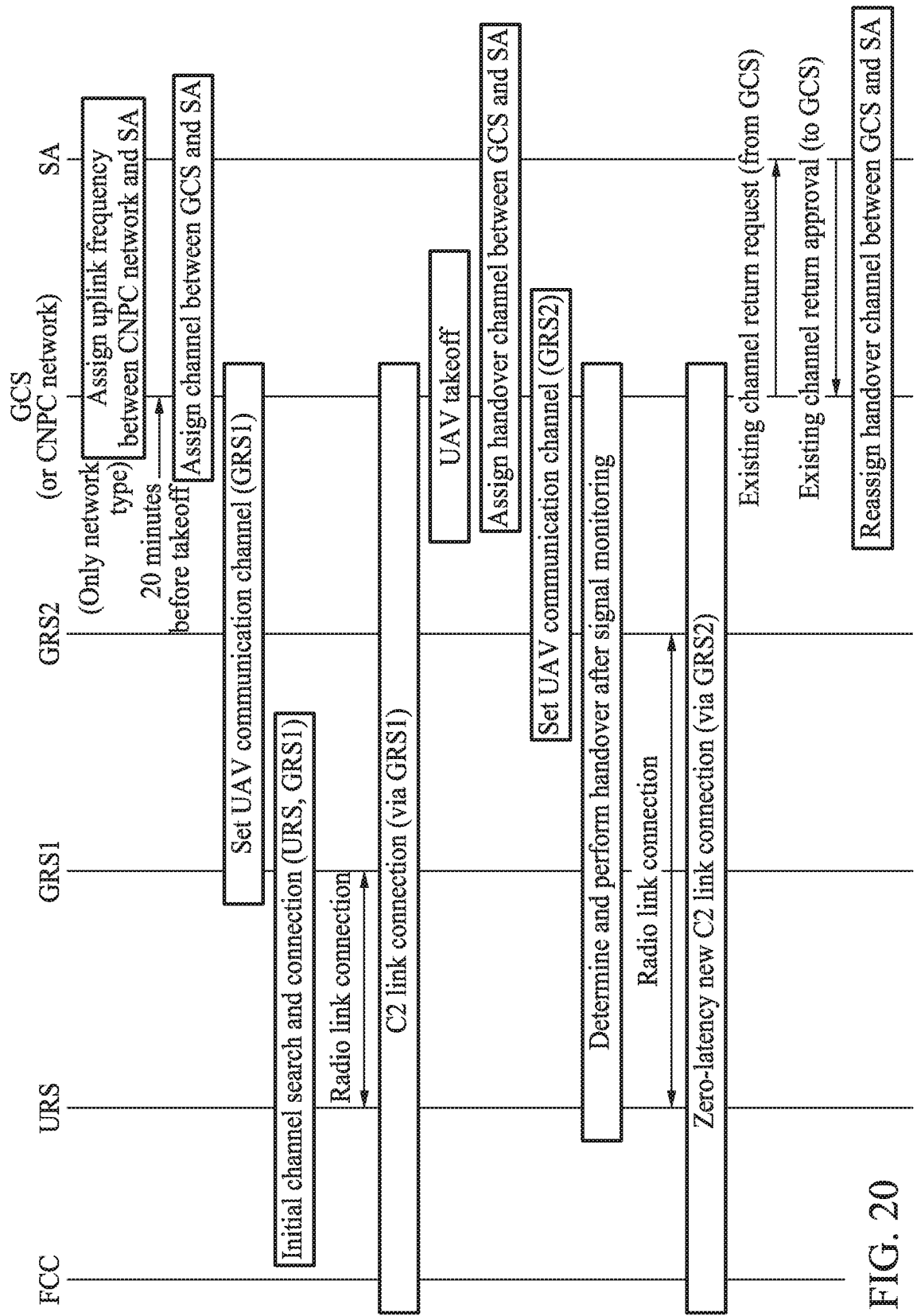
FIG. 20 illustrates another example of a channel assignment process during an operation period of an UAV CNPC system according to example embodiments.

FIG. 20 illustrates another example of a channel assignment process during an operation period of an UAV CNPC system according to example embodiments.

FIG. 20 illustrates a channel assignment, return, and reassignment process when performing an inter-cell handover.

A procedure in which a SA assigns a channel to a GCS 20 minutes before takeoff and the GCS forms a CNPC link is the same as the aforementioned initial channel assignment procedure before takeoff. Once a UAV takes off under the UAV control through the CNPC link connected through a GRS1, the SA assigns an inter-cell handover channel to the GCS. Here, similar to the initial CNPC channel assignment procedure, in the case of an inter-cell handover CNPC channel assignment procedure, the CNPC channel assignment between the GCS and the SA in the P2P type and the CNPC channel assignment between the GCS and the SA in the P2MP type follow the aforementioned channel assignment process between the GCS and the SA based on the distributive channel assignment and the central channel assignment.

In the P2P type, the SA assigns an uplink FDMA channel and a downlink FDMA channel to the GCS. In the P2MP type, the GCS receives a downlink FDMA frequency channel and a time slot of an uplink TDM frequency channel assigned from the SA to the CNPC network.

A URS and a GRS2 corresponding to a handover target set the inter-cell handover channel assigned to the GCS. The GCS (in the case of a standalone type) or the CNPC network (in the case of a network type) determines whether to perform a handover based on an existing CNPC link (if a signal transmission for measurement is absent in the GRS2) monitoring result of the URS or a handover CNPC link (if the signal transmission for measurement is present in the GRS2) monitoring result of the URS. The URS and the GCS perform the handover and change a channel with the set handover channel.

FIG. 20 illustrates an inter-cell handover procedure in the case of transmitting a measurement signal to determine whether to perform a handover. Based on CNPC requirements that the GRS2 of international civil aviation organization (ICAO) requires a URS signal monitoring, a case in which the signal transmission for measurement is present in the GRS2 may be appropriate compared to a case in which the signal transmission for measurement is absent in the GRS2.

The URS and the GRS2 perform the inter-cell handover, connect a radio link to the handover CNPC channel, and a handover channel-based CNPC link is connected between the FCC and the GCS through the connected radio link.

Once the connection of the CNPC link is completed, the GCS performs a procedure of returning an existing channel and a new handover channel is reassigned to the GCS. Here, similar to the initial CNPC channel assignment procedure, in the case of a reassignment procedure of the new handover CNPC channel, the CNPC channel assignment between the GCS and the SA in the P2P type and the CNPC channel assignment between the GCS and the SA in the P2MP type follow the aforementioned channel assignment process between the GCS and the SA based on the distributive channel assignment and the central channel assignment.

Return of the existing channel and reassignment of the new cell handover channel may not be applied to the GCS. Whether to return the existing channel and to receive reassignment of the new channel may be determined by the GCS based on an UAV flight plan, the stability of system operation, channel assignment cost, and the like.

For example, when the UAV has a flight plan of returning from the cell coverage of the GRS2 to the cell coverage of the GRS1, the GCS may maintain the existing channel instead of returning the existing channel to the SA. When the UAV lands in the cell coverage of the GRS2, a channel may not be assigned to the GCS.

Figure 21:
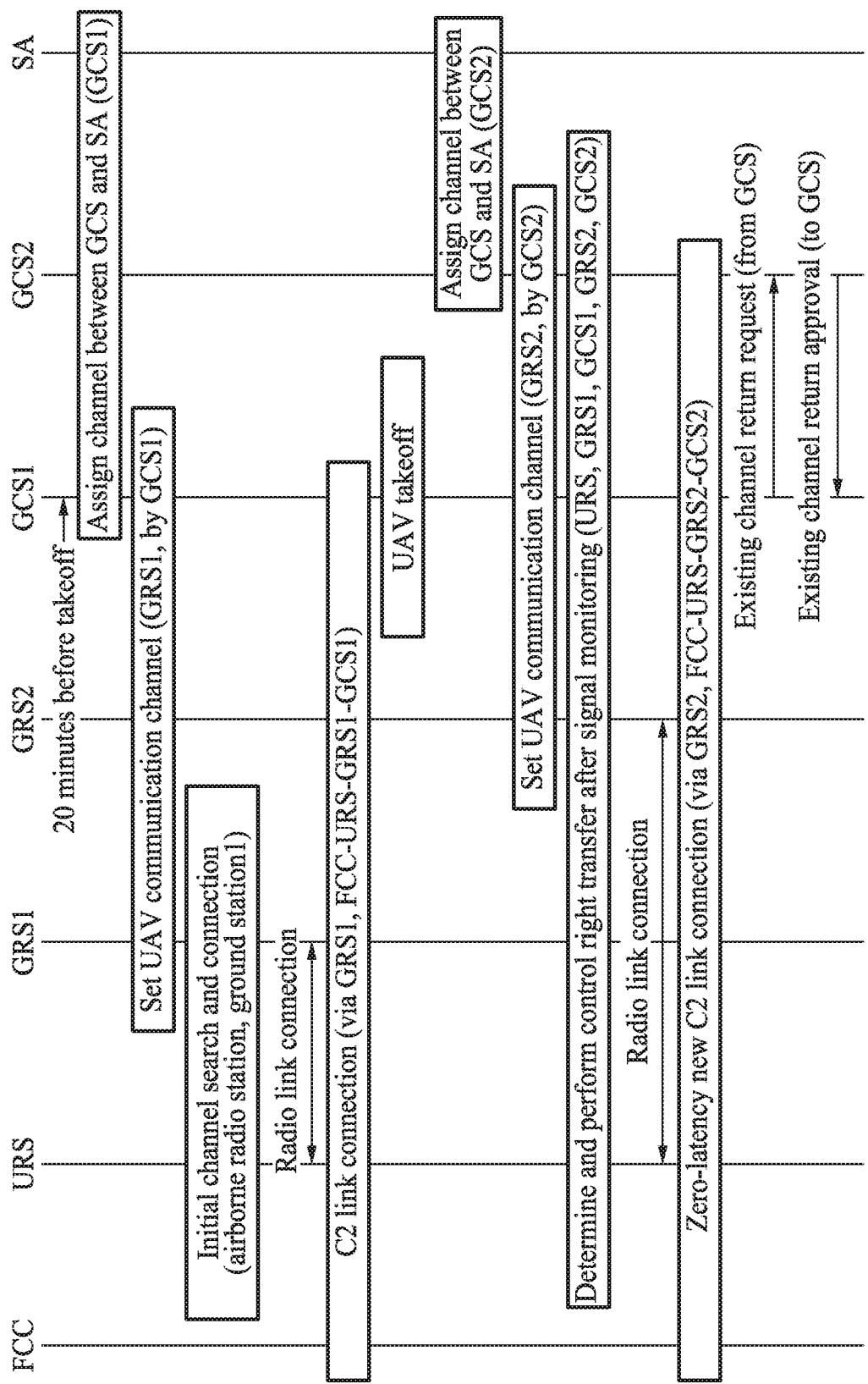
FIG. 21 illustrates another example of a channel assignment process during an operation period of an UAV CNPC system according to example embodiments.

FIG. 21 illustrates another example of a channel assignment process during an operation period of an UAV CNPC system according to example embodiments.

FIG. 21 illustrates a channel assignment, return, and assignment process when transferring a control right.

A procedure in which an SA assigns a channel to a GCS1 20 minutes before takeoff and the GCS1 forms a CNPC link is the same as the aforementioned initial channel assignment procedure before takeoff. Once a UAV takes off under the UAV control through a CNPC link connected through the GCS1, the SA assigns, to a GCS2, a channel for a control right transfer.

Here, similar to the initial CNPC channel assignment procedure, in the case of an assignment procedure of the CNPC channel for control right transfer, the CNPC channel assignment between the GCS and the SA in the P2P type and the CNPC channel assignment between the GCS and the SA in the P2MP type follow the aforementioned channel assignment process between the GCS and the SA based on the distributive channel assignment and the central channel assignment.

In the P2P type, the SA assigns an uplink FDMA channel and a downlink FDMA channel to the GCS2. In the P2MP type, the GCS2 receives a downlink FDMA frequency channel and a time slot of an uplink TDM frequency channel assigned from the SA to the CNPC network.

A URS and the GRS2 corresponding to a handover target set the channel for control right transfer assigned to the GCS2. The GCS1 or the GCS2 determines whether to transfer the control right based on an existing CNPC link (if a signal transmission for measurement is absent in the GRS2) monitoring result of the URS or a handover CNPC link (if the signal transmission for measurement is present in the GRS2) monitoring result of the URS. The URS transfers the control light and changes a channel with the set channel for transferring control light. Based on CNPC requirements that the GRS2 of ICAO requires a URS signal monitoring, a case in which the signal transmission for measurement is present in the GRS2 may be appropriate compared to a case in which the signal transmission for measurement is absent in the GRS2.

The URS and the GRS2 perform the control right transfer, connect a radio link to the CNPC channel for control light transfer, and a control right transfer channel-based CNPC link is connected between an FCC and the GCS through the connected radio link. Once the connection of the CNPC link is completed, the GCS1 performs a procedure of returning an existing channel.

Here, the GCS may maintain the existing channel instead of returning the existing channel. Alternatively, the GCS may return the channel and the new channel may be assigned to the GCS. Whether to return the existing channel and to receive assignment of the new channel may be determined by the GCS1 based on a UAV flight plan, the stability of system operation, channel assignment cost, and the like.

For example, when the UAV has a flight plan of returning from the cell coverage of the GRS2 to the cell coverage of the GRS1, the GCS1 may maintain the existing channel instead of returning the existing channel to the SA. When the UAV performs the control right transfer and returns to the GCS1 after the mission, the GCS1 may return the channel. When a new channel for control right transfer is re-assignable (based on an aspect that each URS may simultaneously maintain a maximum of two channels), the new channel for control right transfer is reassigned to the GCS.

Here, similar to the initial CNPC channel assignment procedure, in the case of a reassignment procedure of the new CNPC channel for control right transfer, the CNPC channel assignment between the GCS and the SA in the P2P type and the CNPC channel assignment between the GCS and the SA in the P2MP type follow the aforementioned channel assignment process between the GCS and the SA based on the distributive channel assignment and the central channel assignment.

Return of the existing channel and reassignment of the new channel for control right transfer may not be applied to the GCS. Whether to return the existing channel and whether to receive reassignment of the new channel may be determined by the GCS1 based on a UAV flight plan, the stability of system operation, channel assignment cost, and the like.

For example, when the UAV has a flight plan of returning from the cell coverage of the GRS2 to the cell coverage of the GRS1, the GCS may maintain the existing channel instead of returning the existing channel to the SA. When the UAV lands in the cell coverage of the GRS2, a channel may not be assigned to the GCS1.

Figure 22:
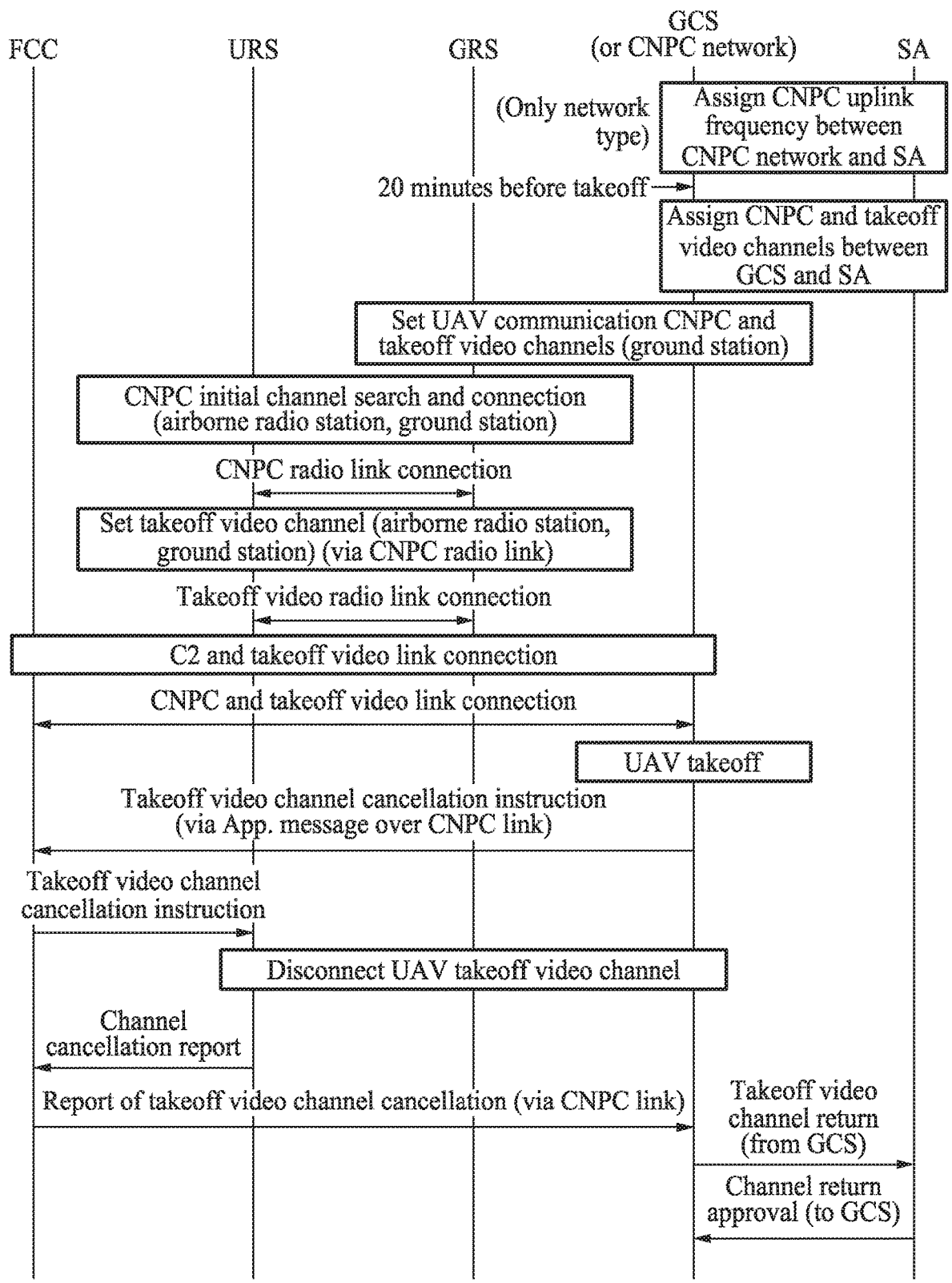
FIG. 22 illustrates another example of a channel assignment process during an operation period of an UAV CNPC system according to example embodiments.

FIG. 22 illustrates another example of a channel assignment process during an operation period of an UAV CNPC system according to example embodiments.

FIG. 22 illustrates a channel assignment and return procedure with respect to a takeoff video channel.

The takeoff video channel is assigned from an SA to a GCS with a CNPC channel 20 minutes before takeoff. Here, the CNPC and video channel assignment procedure between the GCS and the SA in the P2P type and the CNPC and video channel assignment procedure between the GCS and the SA in the P2MP type follow the aforementioned channel assignment process between the GCS and the SA based on the distributive channel assignment and the central channel assignment.

Once the channel assignment between the GCS and the SA is completed 20 minutes before takeoff according to the process, the assigned CNPC and video channels are set as channels of the GRS. In the case of a standalone type, the GCS performs the channel setting. In the case of a network type, the CNPC network performs the channel setting.

Once the channel setting of the GRS is completed, the GRS and a URS form a radio link using the corresponding CNPC channel through an initial channel search and connection process. The URS and the GRS form a video radio link for takeoff through the connected CNPC radio link. Through the connected radio link, the CNPC radio link and the takeoff video link are connected between an FCC and the GCS.

Once the UAV takes off, the takeoff video channel needs to be returned so that another GCS may use the takeoff video channel for takeoff of an UAV. Accordingly, the GCS instructs the FCC to disconnect the takeoff video channel after takeoff of the UAV. In response to an instruction from the FCC, the URS and the GRS cancel setting of the takeoff video channel Once the setting is cancelled, the GCS performs a procedure of returning the takeoff video channel to the SA.

Figure 23:
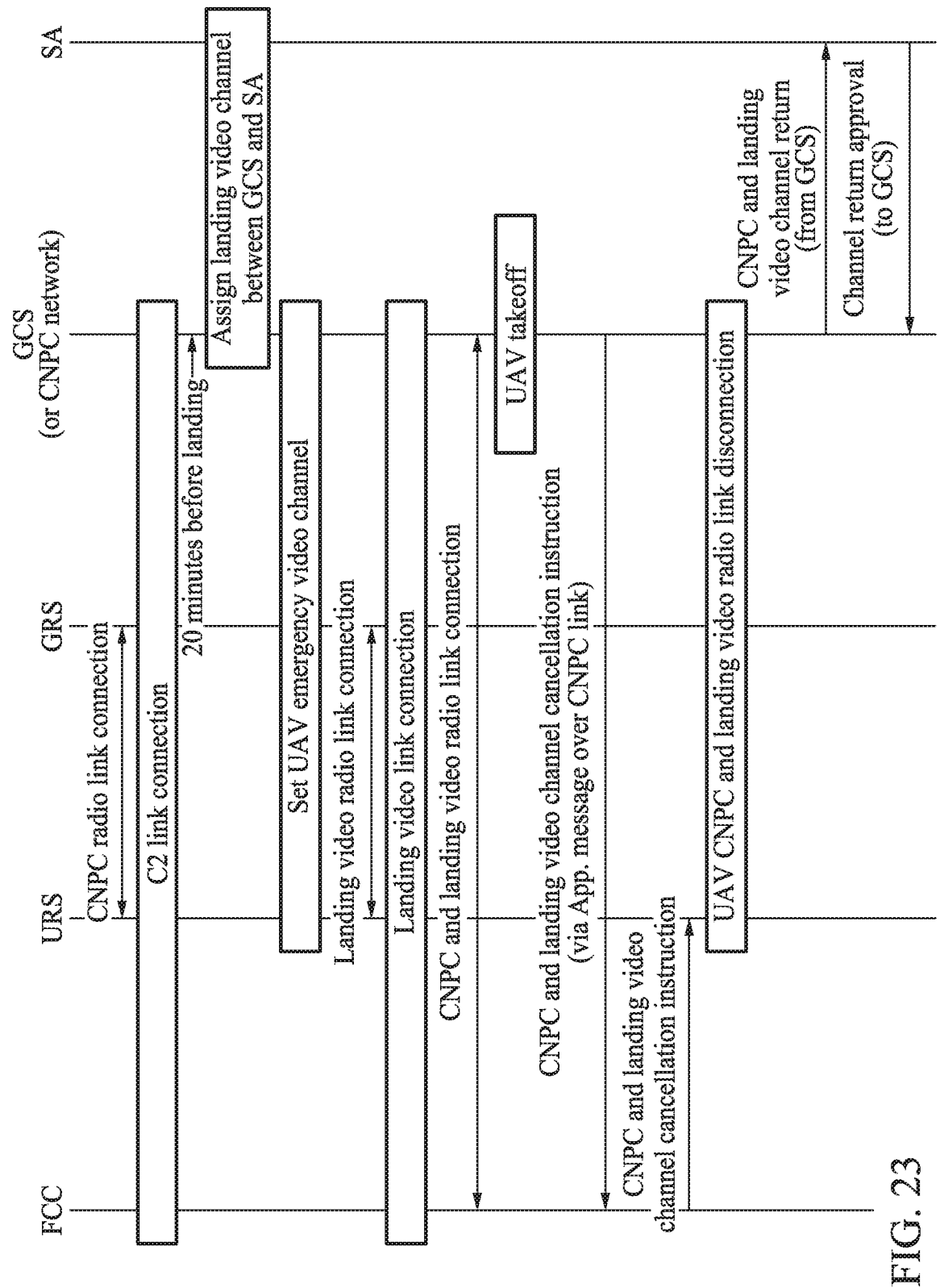
FIG. 23 illustrates another example of a channel assignment process during an operation period of an UAV CNPC system according to example embodiments.

FIG. 23 illustrates another example of a channel assignment process during an operation period of an UAV CNPC system according to example embodiments.

FIG. 23 illustrates a channel assignment and return procedure with respect to a landing video channel.

The landing video channel is assigned from an SA to a GCS 20 minutes before landing. Here, the CNPC channel and landing video channel assignment procedure between the GCS and the SA in the P2P type and the CNPC channel and video channel assignment procedure between the GCS and the SA in the P2MP type follow the aforementioned channel assignment process between the GCS and the SA based on the distributive channel assignment and the central channel assignment.

Once the channel assignment between the GCS and the SA is completed 20 minutes before landing according to the process, a URS and a GRS perform a channel setting using the assigned landing video channel through the connected CNPC channel. In the case of a standalone type, the GCS performs the channel setting. In the case of a network type, the CNPC network performs the channel setting. Once the landing video channel setting of the GRS and the URS is completed, the landing video link is connected between an FCC and the GCS through the connected radio link.

Once the UAV lands, the landing video channel needs to be returned so that another GCS may use the landing video channel for landing of an UAV. Accordingly, the GCS instructs the FCC to disconnect the CNPC channel and to disconnect the landing video channel after landing of the UAV. In response to an instruction from the FCC, the URS and the GRS cancel setting of the CNPC channel and the video channel of the UAV. Once the setting is cancelled, the GCS performs a procedure of returning the CNPC channel and the landing video channel to the SA.

Figure 24:
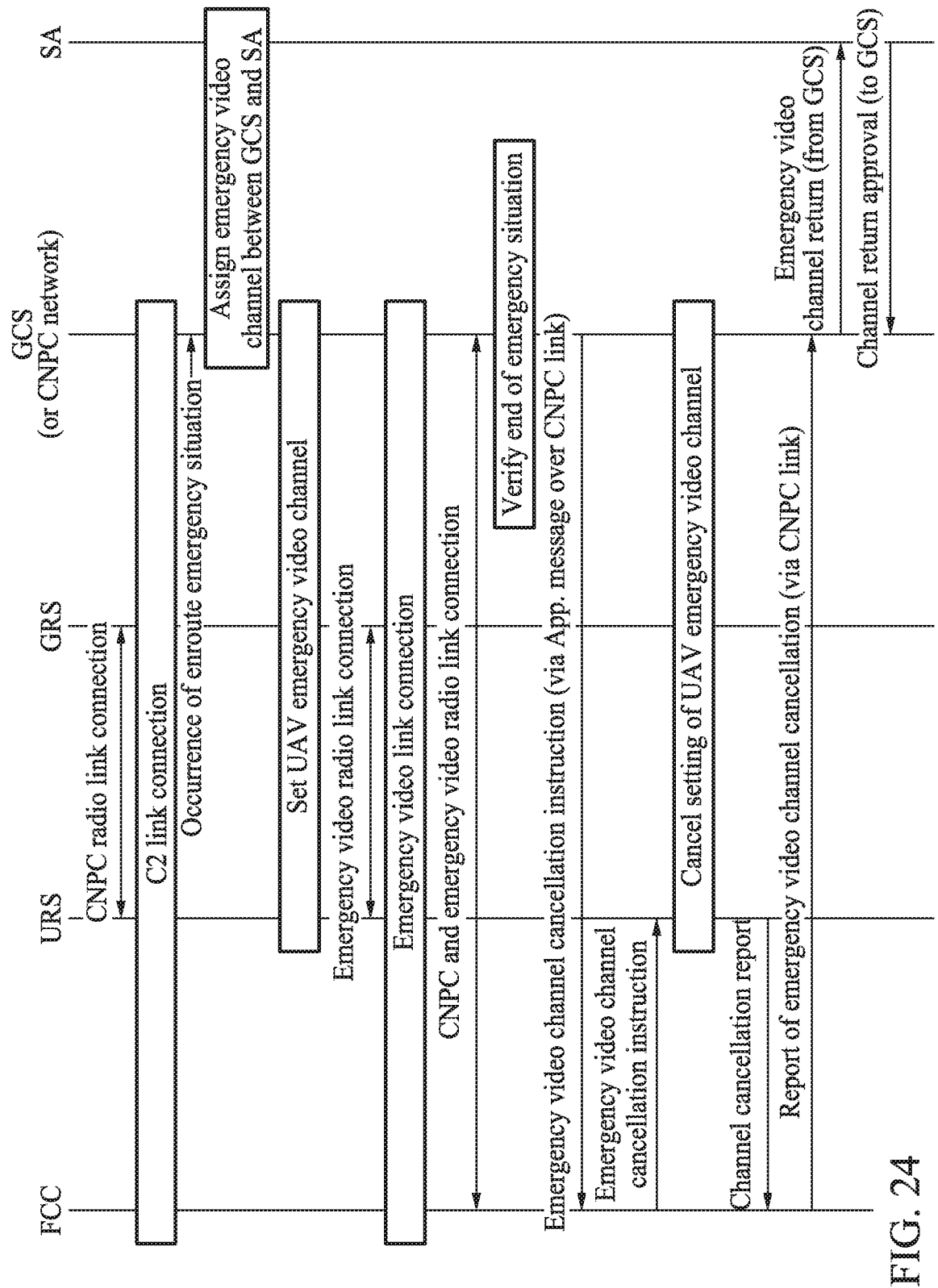
FIG. 24 illustrates another example of a channel assignment process during an operation period of an UAV CNPC system according to example embodiments.

FIG. 24 illustrates another example of a channel assignment process during an operation period of an UAV CNPC system according to example embodiments.

FIG. 24 illustrates a channel assignment and return procedure with respect to an emergency video channel.

The emergency video channel is assigned from an SA to a GCS in response to a need for auxiliary video information due to an occurrence of an emergency situation, such as a weather deterioration and the like, in an enroute situation. Here, the emergency video channel assignment procedure between the GCS and the SA in the P2P type and the emergency video channel assignment procedure between the GCS and the SA in the P2MP type follow the aforementioned channel assignment process between the GCS and the SA based on the distributive channel assignment and the central channel assignment.

Once the channel assignment between the GCS and the SA is completed in the emergency situation according to the process, a URS and a GRS perform channel setting using the assigned emergency video channel through the connected CNPC channel. In the case of a standalone type, the GCS performs the channel setting. In the case of a network type, the CNPC network performs the channel setting. Once the emergency video channel of the GRS and the URS is completed, the emergency video link is connected between an FCC and the GCS through the connected radio link.

Once the emergency situation of the UAV is terminated, the emergency video channel needs to be returned so that another GCS may use the emergency video channel for an emergency situation of another UAV. Accordingly, once the emergency situation is terminated, the GCS instructs the FCC to cancel setting of the emergency video channel. In response to an instruction of the FCC, the URS and the GRS cancel the setting of the emergency video channel. Once the setting is cancelled, the GCS performs a procedure of returning the emergency video channel to the SA.

According to example embodiments, an SA may not statically assign a CNPC channel and takeoff and landing/emergency video channels to a specific UAV CNPC system at a specific frequency, and may manage all of the frequencies in real time. In addition, the SA may dynamically assign the CNPC channel and the takeoff and landing/emergency video channels only for an operation of a UAV CNPC system and may retrieve the assigned channel immediately after the operation is completed, so that another UAV CNPC system may reuse the CNPC channel and the takeoff and landing/emergency video channels. Thus, another UAV CNPC system may reuse the frequency of the CNPC channel. In this manner, it is possible to enhance a use of a limited UAV control frequency. Also, the example embodiments may be applied even to a future P2MP CNPC system that simultaneously supports a plurality of UAVs.

The units and/or modules described herein may be implemented using hardware components, software components, and/or combination thereof. For example, the hardware components may include microphones, amplifiers, bandpass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include plurality of processing elements and plurality of types of processing elements. For example, a processing device may include plurality of processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A channel assignment method comprising:
receiving assignment data and an interference analysis criterion from a spectrum authority;
performing an interference analysis and selecting a control and non-payload communication (CNPC) channel based on the assignment data and the interference analysis criterion; and
requesting the spectrum authority for assigning the CNPC channel,
wherein the CNPC channel includes an uplink and a downlink, and
wherein the selecting comprises receiving an assignment of a center frequency and a bandwidth corresponding to the uplink from the spectrum authority;
selecting a ground radio station to operate an UAV; and
selecting a number of time slots and locations of the time slots to be used for a center frequency and a bandwidth of the ground radio station corresponding to the uplink based on the assignment data and the interference analysis criterion,
wherein the requesting comprises requesting the spectrum authority for the number of time slots and the locations of the time slots.

2. The method of claim 1, further comprising:
transmitting a confirmation message to the spectrum authority in response to receiving a request approval from the spectrum authority.

3. The method of claim 1, further comprising:
receiving second assignment data and a second interference analysis criterion from the spectrum authority in response to receiving a request approval disallowance from the spectrum authority;
performing an interference analysis on the second assignment data and selecting a second CNPC channel based on the second interference analysis criterion; and
requesting the spectrum authority for assigning the second CNPC channel.

4. The method of claim 1, further comprising:
instructing an unmanned aerial vehicle (UAV) to perform a contingency plan in response to receiving a request approval disallowance from the spectrum authority.

5. The method of claim 1, wherein the selecting comprises selecting a center frequency and a bandwidth corresponding to the downlink based on the assignment data and the interference analysis criterion, and
the requesting comprises requesting the spectrum authority for the center frequency and the bandwidth corresponding to the downlink.

6. The method of claim 1, further comprising:
performing the interference analysis and selecting a video channel based on the assignment data and the interference analysis criterion; and
requesting the spectrum authority for assigning the video channel.

7. The method of claim 6, wherein the video channel includes at least one of a takeoff video channel, a landing video channel, and an emergency video channel.

8. The method of claim 1, further comprising:
receiving an assignment of a handover channel from the spectrum authority; and
performing a handover from the CNPC channel to the handover channel.

9. The method of claim 1, further comprising:
disconnecting a CNPC radio link in response to landing of an UAV; and
returning the CNPC channel to the spectrum authority.

10. A channel assignment method comprising:
receiving a request for assigning operation control and non-payload communication (CNPC) transmission and reception information and a CNPC channel from a ground control station;
performing an interference analysis and determining whether the CNPC channel is assignable based on the operation CNPC transmission and reception information and an interference analysis criterion; and
transmitting information regarding the determination as to whether the CNPC channel is assignable to the ground control station,
wherein the CNPC channel includes an uplink and a downlink,
wherein the determining comprises assigning a center frequency and a bandwidth corresponding to the uplink to the ground control station;
selecting a ground radio station to operate an unmanned aerial vehicle UAV; and
selecting a number of time slots and locations of the time slots to be used for a center frequency and a bandwidth of the ground radio station corresponding to the uplink and determining whether the CNPC channel is assignable based on the operation CNPC transmission and reception information and the interference analysis criterion.

11. The method of claim 10, wherein the transmitting comprises:
notifying the ground control station of an assignment request approval of the CNPC channel in response to the CNPC channel being determined to be assignable; and
providing information of the CNPC channel to the ground control station.

12. The method of claim 10, wherein the transmitting comprises:
notifying the ground control station of an assignment request approval disallowance of the CNPC channel in response to the CNPC channel being determined to be un-assignable; and
providing a reason of the assignment request approval disallowance to the ground control station.

13. The method of claim 10, wherein the determining comprises selecting a center frequency and a bandwidth corresponding to the downlink and determining whether the CNPC channel is assignable based on the operation CNPC transmission and reception information and the interference analysis criterion.

14. The method of claim 10, further comprising:
receiving video channel transmission and reception information, takeoff airport information, and a request for assigning a video channel from the ground control station; and
performing the interference analysis and determining whether the video channel is assignable based on the video channel transmission and reception information and the takeoff airport information.

15. The method of claim 14, wherein the video channel includes at least one of a takeoff video channel, a landing video channel, and an emergency video channel.

16. The method of claim 10, further comprising:
receiving a return of the CNPC channel from the ground control station in response to a disconnection of a CNPC radio link; and
approving the return of the CNPC channel with respect to the ground control station.

* * * * *